US010042340B2

(12) United States Patent
Hofschulz et al.

(10) Patent No.: US 10,042,340 B2
(45) Date of Patent: Aug. 7, 2018

(54) SYSTEMS AND METHODS FOR EXTENDING THE BATTERY LIFE OF A WIRELESS SENSOR IN A BUILDING CONTROL SYSTEM

(71) Applicant: Johnson Controls Technology Company, Holland, MI (US)

(72) Inventors: Heidi A. Hofschulz, Milwaukee, WI (US); Robert D. Turney, Watertown, WI (US); Timothy C. Gamroth, Dousman, WI (US); Matthew J. Ellis, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 200 days.

(21) Appl. No.: 14/989,740

(22) Filed: Jan. 6, 2016

(65) Prior Publication Data
US 2017/0192400 A1    Jul. 6, 2017

(51) Int. Cl.
| | |
|---|---|
| *G01M 1/38* | (2006.01) |
| *G05B 15/02* | (2006.01) |
| *G01D 11/00* | (2006.01) |
| *G01D 9/32* | (2006.01) |
| *H04W 52/02* | (2009.01) |
| *H04W 4/70* | (2018.01) |

(52) U.S. Cl.
CPC ............... *G05B 15/02* (2013.01); *G01D 9/32* (2013.01); *G01D 11/00* (2013.01); *H04W 4/70* (2018.02); *H04W 52/0209* (2013.01); *H04W 52/0216* (2013.01); *Y02D 70/00* (2018.01); *Y02D 70/142* (2018.01); *Y02D 70/144* (2018.01); *Y02D 70/162* (2018.01); *Y02D 70/166* (2018.01)

(58) Field of Classification Search
CPC .......... G05B 15/02; G01D 9/32; G01D 11/00; H04W 4/005; H04W 52/0209; H04W 52/0216
USPC ........................................................ 700/275
See application file for complete search history.

(56) References Cited

U.S. PATENT DOCUMENTS

| | | |
|---|---|---|
| 2014/0297210 A1 | 10/2014 | Kamel et al. |
| 2014/0316743 A1 | 10/2014 | Drees et al. |
| (Continued) | | |

FOREIGN PATENT DOCUMENTS

WO    WO 2014/085137    6/2014

OTHER PUBLICATIONS

Search Report and Written Opinion for International Application No. PCT/US2017/012399, dated Mar. 27, 2017, 14 pages.

*Primary Examiner* — Robert Cassity
(74) *Attorney, Agent, or Firm* — Foley & Lardner LLP

(57) ABSTRACT

A building control system includes a wireless measurement device and a controller. The wireless measurement device measures a plurality of values of an environmental variable and uses the plurality of measured values to predict one or more future values of the environmental variable. The wireless device periodically transmits, at a transmission interval, a message that includes a current value of the environmental variable and the one or more predicted values of the environmental variable. The controller receives the message from the wireless device and parses the message to extract the current value and the one or more predicted future values of the environmental variable. The controller periodically and sequentially applies, at a controller update interval shorter than the transmission interval, each of the extracted values as an input to a control algorithm that operates to control the environmental variable.

17 Claims, 13 Drawing Sheets

(56) References Cited

U.S. PATENT DOCUMENTS

2015/0167996 A1 6/2015 Fadell et al.
2015/0316907 A1 11/2015 Elbsat et al.

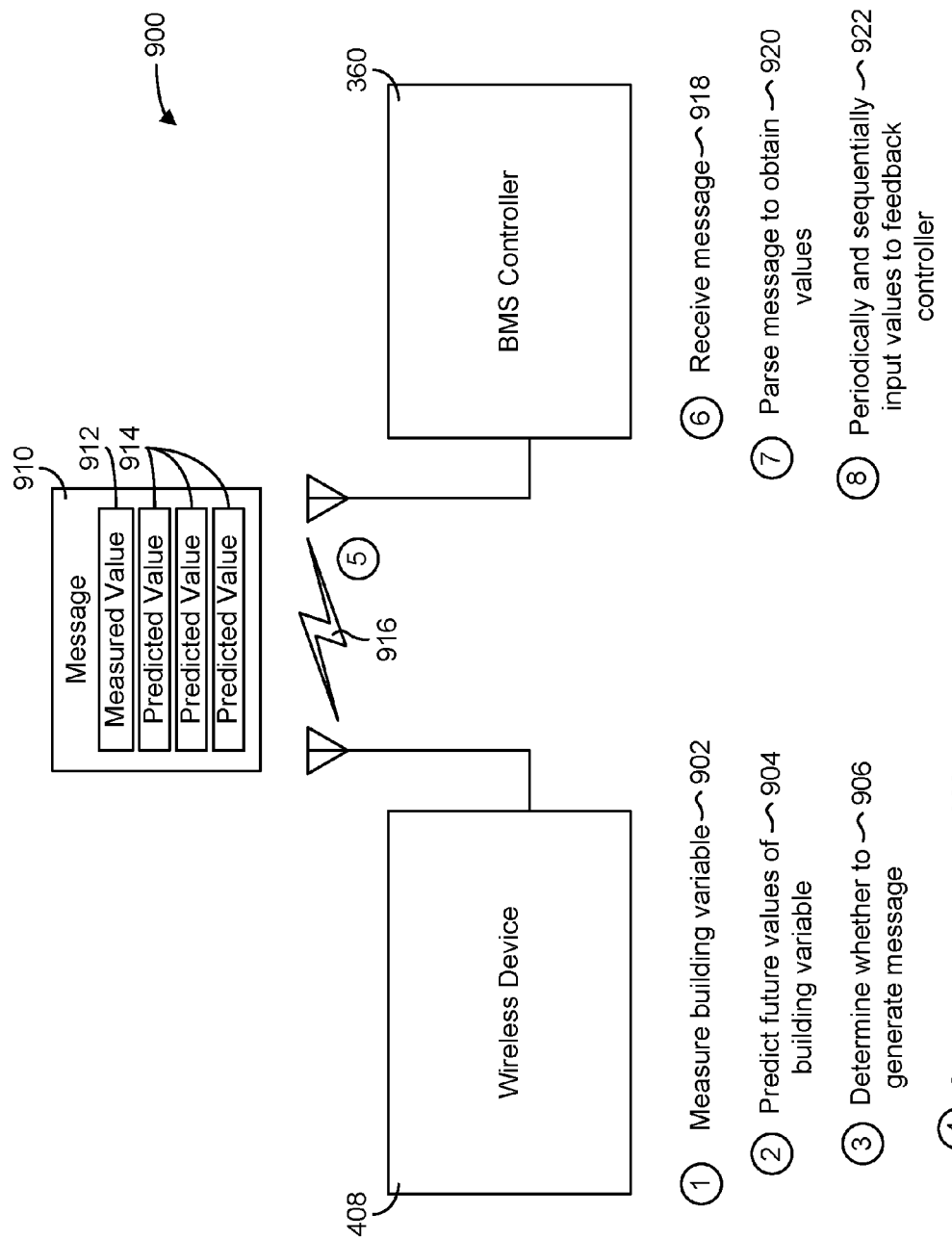

SYSTEMS AND METHODS FOR EXTENDING THE BATTERY LIFE OF A WIRELESS SENSOR IN A BUILDING CONTROL SYSTEM

BACKGROUND

The present invention relates generally to methods for managing building systems. The present invention relates more particularly to systems and methods for conserving power when transmitting sensor data to a building management system.

A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. Wireless devices such as wireless sensors may use a large portion of battery life transmitting data.

Conventional methods of transmitting data from wireless sensors may include measuring and transmitting one value at a time. The collection and transmission interval may align with the controller update period, providing a responsive system. However, battery life may diminish quickly. It would be desirable to provide a method for wirelessly transmitting sensor data which overcomes the disadvantages of established methods.

SUMMARY

One implementation of the present disclosure is a building control system which includes a wireless measurement device. The wireless measurement device includes a sensor that measures a plurality of values of an environmental variable at a location of the wireless device, a predictor that uses the plurality of measured values of the environmental variable to predict one or more future values of the environmental variable, and a first wireless radio that periodically transmits, at a transmission interval, a message comprising a current value of the environmental variable and the one or more predicted values of the environmental variable. The building control system also includes a controller. The controller includes a second wireless radio that receives the message from the wireless device, a message parser that parses the message to extract the current value and the one or more predicted future values of the environmental variable, and a feedback controller that periodically and sequentially applies, at a controller update interval shorter than the transmission interval, each of the extracted values as an input to a control algorithm that operates to control the environmental variable.

In some embodiments, the wireless measurement device periodically measures the environmental variable at a measurement interval shorter than the transmission interval. In other embodiments, the wireless measurement device compares an actual measured value of the environmental variable with a previously-predicted value of the environmental variable, and transmits the message to the controller in response to a determination that the actual measured value differs from the previously-predicted value.

In some embodiments, the wireless measurement device predicts a future value of the environmental variable for each controller update interval within the current transmission interval.

In other embodiments, the wireless measurement device compares a current measured value of the environmental variable with a previous measured value of the environmental variable, determines a rate of change of the environmental variable between the current and previous measured value, and transmits the message to the controller in response to a determination that the rate of change exceeds a threshold.

In some embodiments, the wireless measurement device compares an actual measured value of the environmental variable at a particular time with a previously-predicted value of the environmental variable for the given time, determines whether a difference between the actual measured value and the previously-predicted value exceeds a threshold, and transmits the message to the controller in response to a determination that the difference between the actual measured value and the previously-predicted value exceeds the threshold.

In some embodiments, the wireless measurement device compares an actual measured value of the environmental variable with at least one of a previously-predicted value of the environmental variable and a previously-measured value of the environmental variable, and redefines a prediction algorithm used by the predictor in response to at least one of: a difference between the actual measured value of the environmental variable and the previously-predicted value of the environmental variable exceeding a threshold, and a rate of change of the value of the environmental variable exceeding a threshold.

Another implementation of the present disclosure is a method for controlling an environmental variable in a building control system. The method includes measuring a plurality of values of the environmental variable using a sensor of a wireless measurement device and predicting one or more future values of the environmental variable based on the plurality of measured values. The method also includes periodically transmitting, at a transmission interval, a message from the wireless measurement device to a controller, the message comprising a current value of the environmental variable and the one or more predicted values of the environmental variable. The method includes parsing the message at the controller to extract the current value and the one or more predicted future values of the environmental variable and periodically and sequentially applying, at a controller update interval shorter than the transmission interval, each of the extracted values as an input to a control algorithm that operates to control the environmental variable.

In some embodiments, measuring the plurality of values of the environmental variable includes periodically measuring the environmental variable at a measurement interval shorter than the transmission interval. In other embodiments, the method further includes comparing a current measured value of the environmental variable with a previous measured value of the environmental variable, determining a rate of change of the environmental variable between the current and previous measured value, and transmitting the message to the controller in response to a determination that the rate of change exceeds a threshold.

In some embodiments, predicting the environmental variable includes predicting a future value of the environmental variable for each controller update interval within the current transmission interval. In other embodiments, the method further includes comparing an actual measured value of the environmental variable at a particular time with a previously-predicted value of the environmental variable for the given time, determining whether a difference between the actual measured value and the previously-predicted value exceeds a threshold, and transmitting the message to the controller in response to a determination that the difference between the actual measured value and the previously-predicted value exceeds the threshold.

In some embodiments, the method further includes comparing an actual measured value of the environmental variable with a previously-predicted value of the environmental variable, and adjusting the transmission interval based on one of: a difference between the actual measured value of the environmental variable and the previously-predicted value of the environmental variable, and a rate of change of the value of the environmental variable.

In some embodiments, the method further includes comparing an actual measured value of the environmental variable with the previously-predicted value of the environmental variable, and redefining a prediction algorithm used by the predictor based on one of: a difference between the actual measured value of the environmental variable and the previously-predicted value of the environmental variable, and a rate of change of the value of the environmental variable.

Yet another implementation of the present disclosure is a wireless measurement device which includes a sensor that measures a plurality of values of an environmental variable at a location of the wireless device. The wireless measurement device also includes a predictor that uses the plurality of measured values of the environmental variable to predict one or more future values of the environmental variable, and a first wireless radio that periodically transmits, at a transmission interval, a message comprising a current value of the environmental variable and the one or more predicted values of the environmental variable.

In some embodiments, the wireless measurement device is configured to periodically measure the environmental variable at a measurement interval shorter than the transmission interval. In some embodiments, the wireless measurement device includes a comparator that compares an actual measured value of the environmental variable with a previously-predicted value of the environmental variable and determines whether a difference between the actual measured value and the previously-predicted value exceeds a threshold. The wireless measurement device also includes a transmission timer that transmits the message to a controller in response to a determination that the actual measured value differs from the previously-predicted value by an amount in excess of the threshold.

In some embodiments, the predictor predicts a future value of the environmental variable for each of a plurality of controller update intervals within the current transmission interval. In some embodiments, the wireless measurement device includes a comparator that compares a current measured value of the environmental variable with a previous measured value of the environmental variable and determines whether a rate of change between the measured values exceeds a threshold. The wireless measurement device also includes a transmission timer that transmits the message to a controller in response to a determination that the rate of change between the measured values exceeds the threshold.

In some embodiments, the wireless measurement device includes a comparator that compares an actual measured value of the environmental variable with a previously-predicted value of the environmental variable. The wireless measurement device also includes a transmission timer that adjusts the transmission interval based on one of: a difference between the actual measured value of the environmental variable and the previously-predicted value of the environmental variable, and a rate of change of the value of the environmental variable.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 9A is a drawing of the new wireless transmission timing process which may be performed by the system of FIG. 4, according to an exemplary embodiment.

DETAILED DESCRIPTION

Overview

Figure 1:
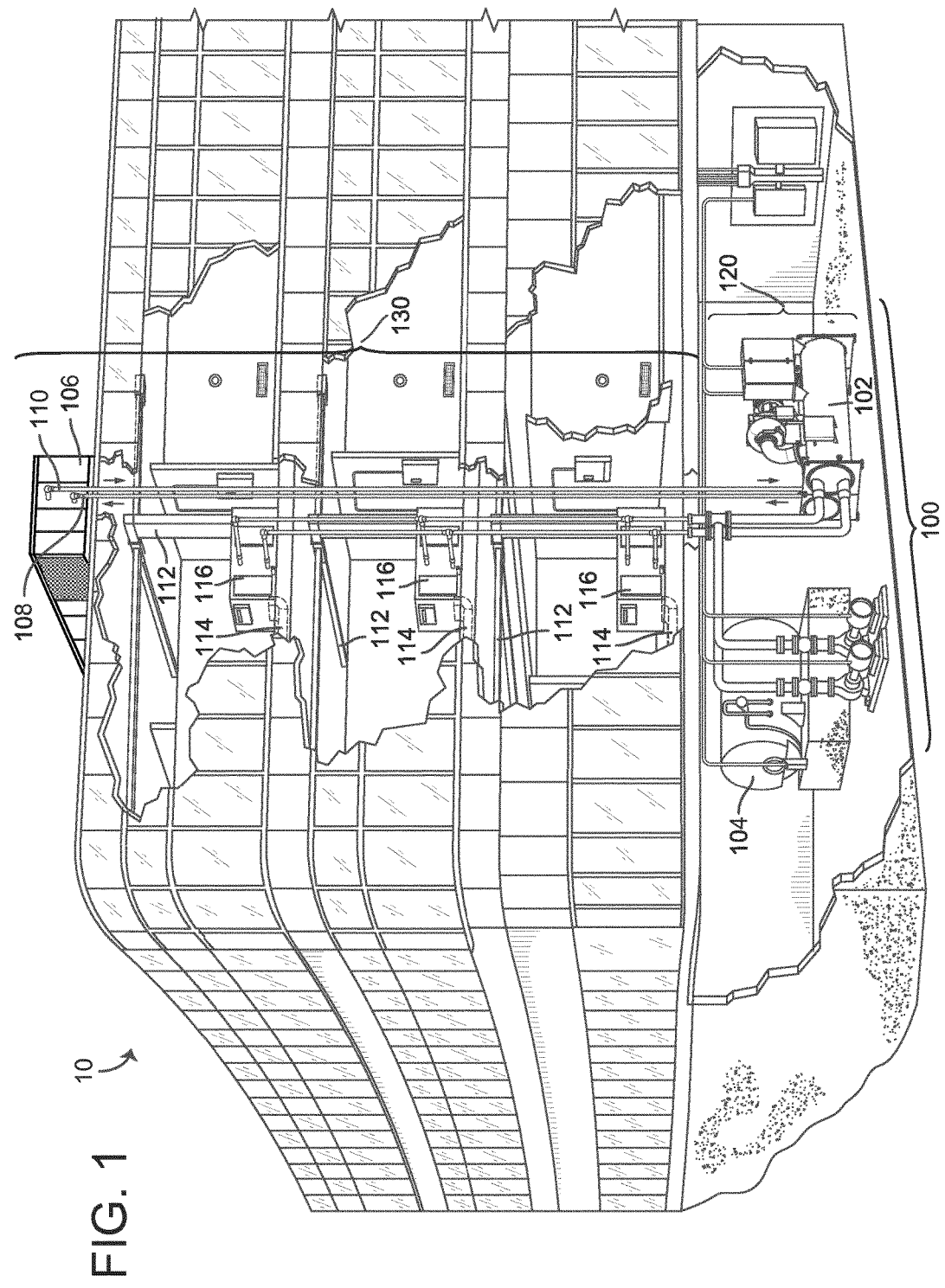
FIG. 1 is a drawing of a building equipped with a HVAC system in which the systems and method of the present disclosure may be implemented, according to an exemplary embodiment.

Referring generally to the FIGURES, a building management system, feedback controller, and components thereof are shown according to various exemplary embodiments. At the most fundamental level, feedback control leverages measurements to make decisions about how to manipulate the inputs of a system so that the controlled system achieves an expected or desirable behavior. Traditionally, wired sensors are used in feedback control systems. However, with the increasing availability and capacity of wireless sensors and wireless communication networks, wireless sensors are becoming a viable alternative to wired sensors.

In a building HVAC system, wireless sensors may be used to monitor a variety of building conditions such as temperature, humidity, pressure, airflow, etc. For example, a wireless temperature sensor may be used to measure the temperature of a building zone and send zone temperature measurements to a feedback controller. The controller subsequently computes control inputs that ensure the zone temperature (i.e., the measured variable) is maintained at a zone temperature setpoint.

While wireless sensors are currently available, many wireless sensors suffer from a short battery life. One of the major challenges of using battery-powered wireless sensors within feedback control applications is that the battery power consumption required to transmit the measurement to the controller may be significant. However, a wireless sensor may use significantly less power when recording measurements than it uses when transmitting a message to a feedback controller. The present disclosure offers systems and methods of prediction to reduce the quantity of transmissions to reduce power consumption and data traffic.

One technique for increasing the battery life of a wireless sensor is to decrease the frequency of transmissions from the wireless sensor to the controller. However, many feedback control systems require the measured variable be measured (or sampled) and fed back to the controller at a sufficiently fast sampling rate relative to the dominant time constant of the system (i.e., the time constant of the dominant dynamic behavior of the system). For example, for zone temperature control, the zone temperature may be sampled (i.e., measured) every minute and transmitted to the controller each minute. Sampling the measured variable less frequently (i.e., increasing the time interval between consecutive measurements) may lead to substantial control performance degradation. In other words, many feedback controllers require a new sample of the measured variable at relatively short intervals (e.g., a new sample each minute) to achieve desirable control performance.

Advantageously, the systems and methods described herein can be used to extend the battery life of wireless sensors (and other wireless devices that transmit measurements) without sacrificing control performance. For example, a wireless measurement device may record measurements of a measured variable at a regular measurement interval (e.g., one measurement per minute). The wireless device may use a series of measurements to predict one or more future values of the measured variable. Multiple values may be sent to the controller in a single message each time the wireless device transmits, thereby reducing the number of transmissions needed. By incorporating advanced algorithms for predicting future values accurately, the proposed systems and methods of the present disclosure may increase the transmission interval, thereby reducing power consumption and data traffic.

In some embodiments, one message is sent each transmission interval, which may be significantly longer than the measurement interval (e.g., one message transmission every four minutes). In some embodiments, the message sent to the feedback controller contains a current value of the measured variable (e.g., a measured value) and one or more predicted values of the measured variable. The predicted values may be based on multiple measurements and past values stored in memory. A message parser on the controller side may extract the multiple values from the message and provide the feedback controller with one value from the message each time the controller updates its control output (i.e., at the beginning of each update interval). In some embodiments, there is no need to change the controller because actual values and predicted values of the measured variable can used by the controller in the same way (i.e., as inputs to a control algorithm) without requiring the controller to know that some of its inputs are predicted and not measured.

One advantage of the current invention results from predicting future measured values of the measured variable and sending the controller multiple predicted values in a single message transmission. This allows the controller to maintain the same responsiveness without sacrificing battery life of the wireless sensor. For example, a building management system may be able to maintain occupant comfort by maintaining a controller update interval of every minute while only receiving messages every four minutes. Better resolution of measurements may be available without transmitting values every controller update interval. Fewer transmissions means less power used by the wireless device. Accordingly, battery life can be extended significantly by employing the systems, methods, and devices of the present disclosure.

Before discussing the FIGURES in detail, it should be noted that the examples provided in the present disclosure are illustrative only and are not limitations on the scope of invention. For example, a one minute sampling interval is used in several of the examples provided herein to simplify the presentation of the calculations and algorithms. However, it is contemplated that any of a variety of sampling intervals can be used (e.g., one second, one minute, three minutes, five minutes, etc.) in addition to those specifically described herein without departing from the scope of the present disclosure.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
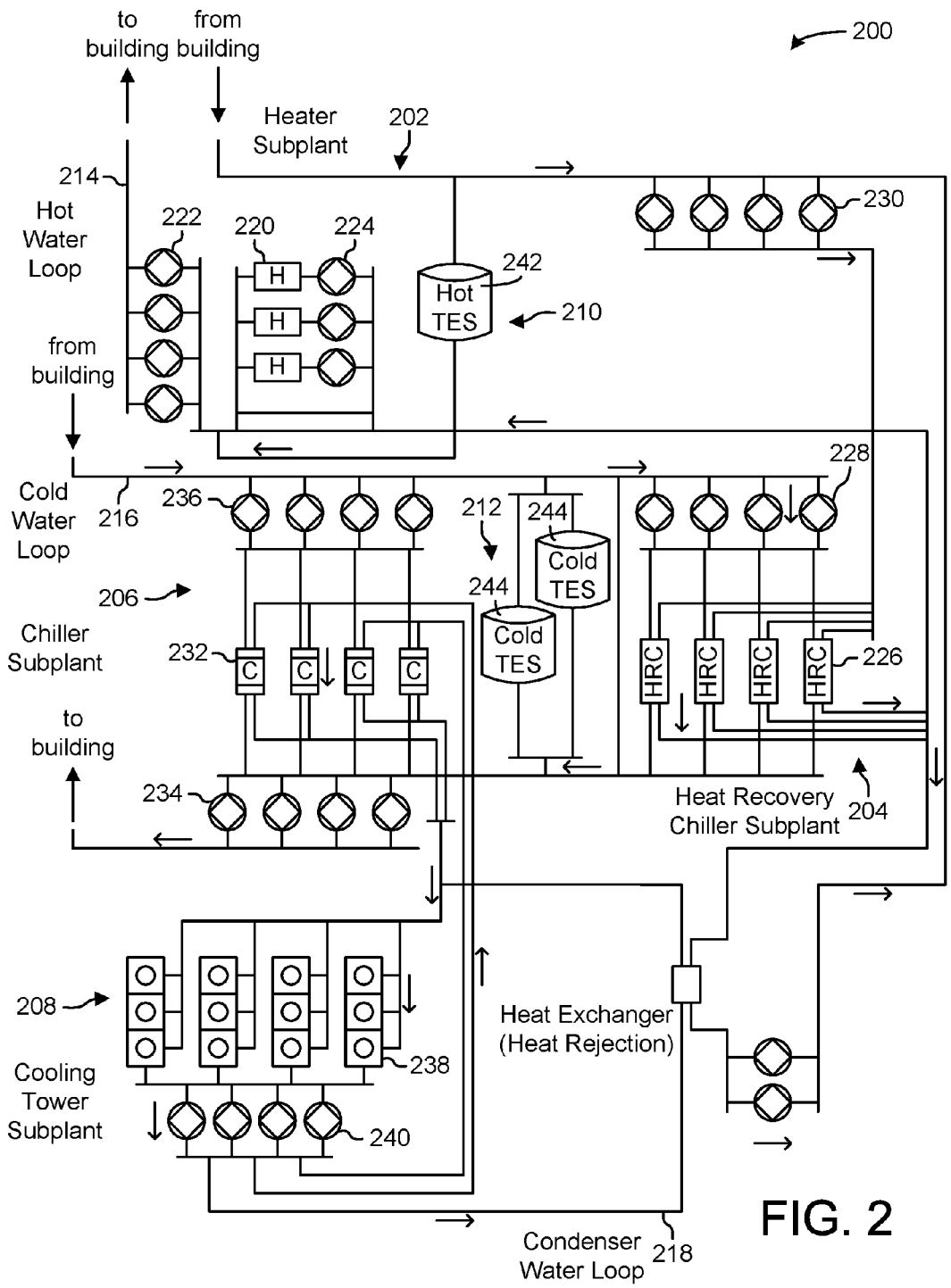
FIG. 2 is a block diagram of a waterside system which may be used in conjunction with the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
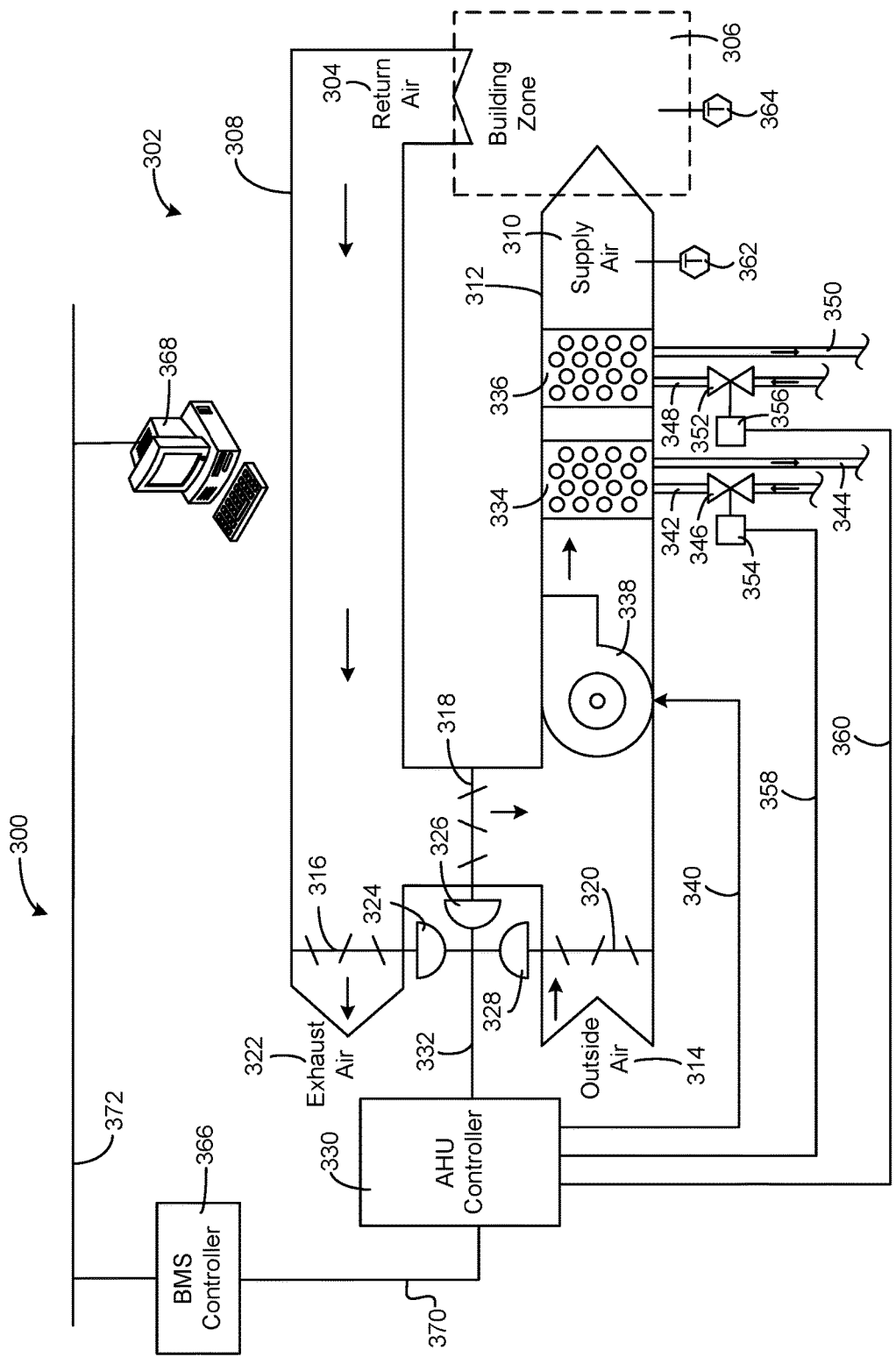
FIG. 3 is a block diagram of an airside system which may be used in conjunction with the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
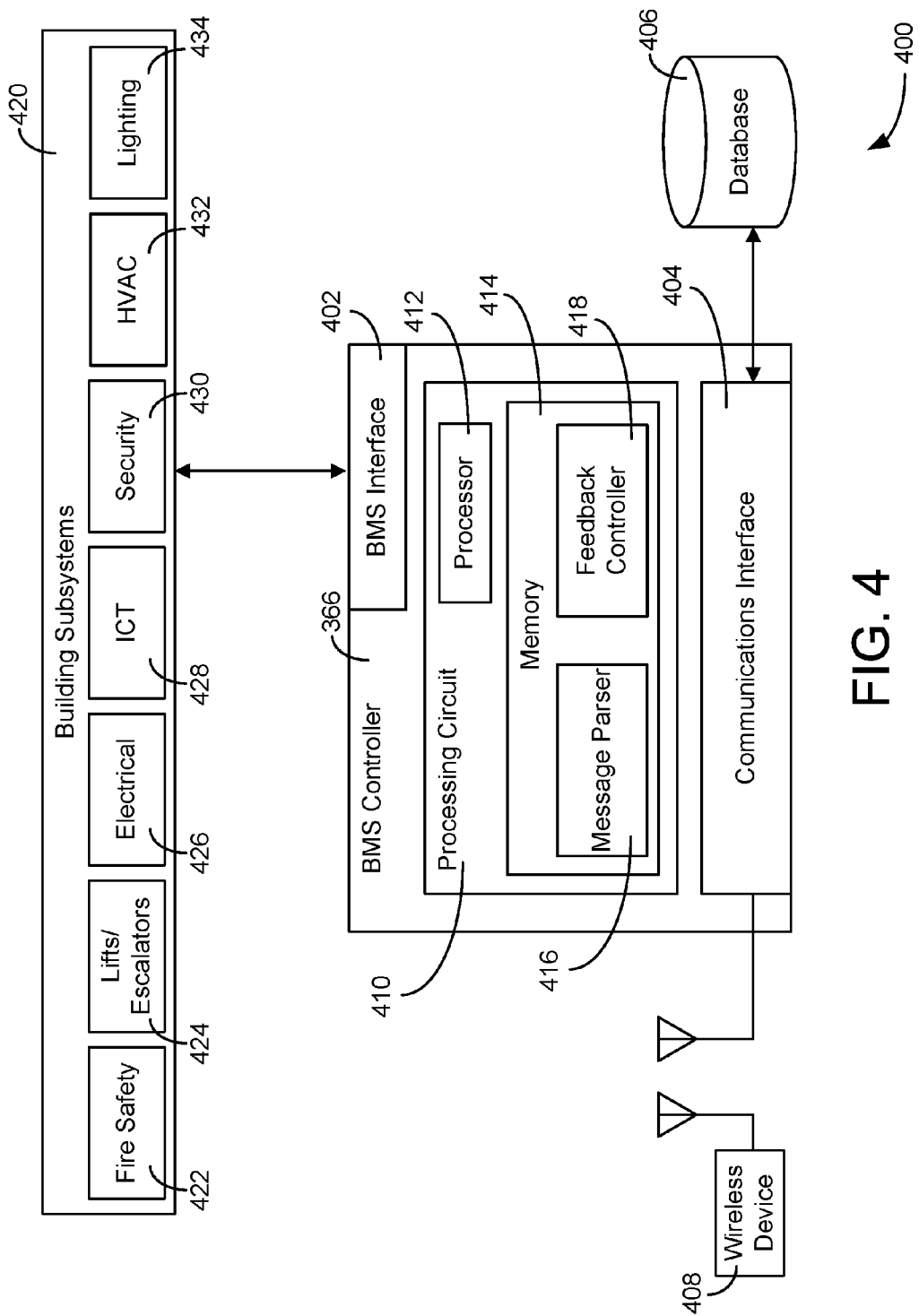
FIG. 4 is a block diagram of a building management system in which the systems and methods of the present disclosure may be implemented, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 420. Building subsystems 420 are shown to include a fire safety system 422, a lift/escalators subsystem 424, a building electrical subsystem 426, an information communication technology (ICT) subsystem 428, a security subsystem 430, a HVAC subsystem 432, and a lighting subsystem 434. In various embodiments, building subsystems 420 can include fewer, additional, or alternative subsystems. For example, building subsystems 420 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 420 include waterside system 200 and/or airside system 300, as described with reference to FIGS. 2-3.

Each of building subsystems 420 may include any number of devices, controllers, and connections for completing its individual functions and control activities. HVAC subsystem 432 may include many of the same components as HVAC system 100, as described with reference to FIGS. 1-3. For example, HVAC subsystem 432 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 434 may include any number of light fixtures, ballasts, lighting sensors, dimmers, or other devices configured to controllably adjust the amount of light provided to a building space. Security subsystem 430 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 404 and a BMS interface 402. Interface 404 may facilitate communications between BMS controller 366 and external applications (e.g., monitoring and reporting applications, enterprise control applications, remote systems and applications, applications residing on client devices, etc.) for allowing user control, monitoring, and adjustment to BMS controller 366 and/or subsystems 420. Interface 404 may also facilitate communications between BMS controller 366 and the client devices. BMS interface 402 may facilitate communications between BMS controller 366 and building subsystems 420 (e.g., HVAC, lighting, security, lifts, power distribution, business, etc.).

Interfaces 402 and 404 can be or include wired or wireless communications interfaces (e.g., jacks, antennas, transmitters, receivers, transceivers, wire terminals, etc.) for conducting data communications with building subsystems 420 or other external systems or devices. In various embodiments, communications via interfaces 402 and 404 may be direct (e.g., local wired or wireless communications) or via a communications network (e.g., a WAN, the Internet, a cellular network, etc.). For example, interfaces 402 and 404 can include an Ethernet card and port for sending and receiving data via an Ethernet-based communications link or network. In another example, interfaces 402 and 404 can include a WiFi transceiver for communicating via a wireless communications network. In another example, one or both of interfaces 402 and 404 may include cellular or mobile phone communications transceivers. In one embodiment, communications interface 404 is a power line communications interface and BMS interface 402 is an Ethernet interface. In other embodiments, both communications interface 404 and BMS interface 402 are Ethernet interfaces or are the same Ethernet interface.

BMS controller 366 may communicate with a wireless device 408. In some embodiments, device 408 includes a wireless sensor. For example, device 408 may include wireless communications abilities and may be able to transmit measured and/or predicted data values to BMS controller 366. Device 408 may be a wireless standalone sensor that is not part of another device. For example, device 408 may be a wireless sensor hidden in a wall, attached to a light fixture, etc. and may be battery operated. In some embodiments, device 408 is integrated with a subsystem of building subsystems 420. For example, device 408 may be a sensor installed in a duct of HVAC subsystem 432. Device 408 may contain one or more of a variety of sensors (e.g., temperature sensors, pressure sensors, etc.) used to monitor building 10.

In some embodiments, device 408 may be a smartphone or tablet. In other embodiments, device 408 may be a laptop or desktop computer, and may not be wireless. Wireless device 408 may be any device which is capable of communication with BMS controller 366 through communications interface 404, and is not limited to the explicitly enumerated devices. It is contemplated that wireless device 408 may communicate with building subsystems 420 directly. BMS controller 366 may transmit building data to device 408 for processing or analysis. Building data may include any relevant data obtained from a component within the building or pertaining to a portion or subsystem of the building. For example, building data may be data from sensors, status control signals, feedback signals from a device, calculated metrics, setpoints, configuration parameters, etc. In some implementations, building data is derived from data collected.

Wireless device 408 may transmit control data to BMS controller 366 in some embodiments. Control data may be any data which affects operation of the BMS. In some embodiments, control data may control building subsystems 420 through BMS controller 366. For example, wireless device 408 may send a signal with a command to enable intrusion detection devices of security subsystem 430. Wireless device 408 may receive building data from BMS controller 366 through communications interface 404.

Still referring to FIG. 4, BMS 400 may include a database 406. Database 406 may include a history of time series values that are measured or calculated in BMS 400. For example, database 406 may include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time series values that provide information about the performance of BMS 400 or a component thereof.

In some embodiments, the time series values in database 406 are measured by various sensors of BMS 400. For example, BMS 400 may include one or more temperature sensors, humidity sensors, enthalpy sensors, pressure sensors, lighting sensors, flow rate sensors, voltage sensors, valve position sensors, load sensors, resource consumption sensors, and/or any other type of sensor capable of measuring a variable of interest in BMS 400. BMS 400 may use the sensors to measure values of one or more time series variables (e.g., environmental variables, control variables, etc.) or parameters that are monitored by BMS 400. In some embodiments, the sensors may be part of device 408. BMS 400 and/or wireless device 408 may use the time series values to calculate a value for each of a plurality of times. A history of values may be stored in database 406. In some embodiments, the values in database 406 are measured values observed by sensors and/or device 408 of BMS 400. In other embodiments, the values in database 406 are provided by an external data source (e.g., data from a utility supplier).

BMS controller 366 is shown to include a processing circuit 410 including a processor 412 and memory 414. Processing circuit 410 may be communicably connected to BMS interface 402 and/or communications interface 404 such that processing circuit 410 and the various components thereof can send and receive data via interfaces 402 and 404. Processor 412 can be implemented as a general purpose processor, an application specific integrated circuit (ASIC), one or more field programmable gate arrays (FPGAs), a group of processing components, or other suitable electronic processing components.

Memory 414 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 414 may be or include volatile memory or non-volatile memory. Memory 414 may include database components, object code components, script components, or any other type of information structure for supporting the various activities and information structures described in the present application. According to an exemplary embodiment, memory 414 is communicably connected to processor 412 via processing circuit 410 and includes computer code for executing (e.g., by processing circuit 410 and/or processor 412) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). For example, BMS controller 366 may be implemented as part of a METASYS® brand building automation system, as sold by Johnson Controls Inc. In other embodiments, BMS controller 366 may be a component of a remote computing system or cloud-based computing system configured to receive and process data from one or more building management systems. For example, BMS controller 366 may be implemented as part of a PANOPTIX® brand building efficiency platform, as sold by Johnson Controls Inc. In other embodiments, BMS controller 366 may be a component of a subsystem level controller (e.g., a HVAC controller), a subplant controller, a device controller (e.g., AHU controller 330, a chiller controller, etc.), a field controller, a computer workstation, a client device, or any other system or device that receives and processes data.

Still referring to FIG. 4, memory 414 is shown to include a message parser 416 and a feedback controller 418. Modules 416 and 418 may be configured to receive inputs from building subsystems 420, wireless device 408, and other data sources, determine optimal control actions for building subsystems 420 based on the inputs, generate control signals based on the optimal control actions, and provide the generated control signals to building subsystems 420. The following paragraphs describe some of the general functions performed by each of modules 416 and 418 in BMS 400.

Message parser 416 may be configured to parse data received by BMS controller 366. For example, a message containing multiple data values (e.g., measured values and/or predicted values) may be received by BMS controller 366. Message parser 416 may be configured to parse the message and extract the multiple data values. Message parser 416 may provide one value at a time to feedback controller 418. Message parser 416 may also or alternatively be configured to flag values as measured or predicted. In yet other embodiments, message parser 416 may provide only values of a certain type to feedback controller 418. For example, message parser 416 may only provide measured values to feedback controller 418. In some embodiments, message parser 416 may organize or order data based on the values or flags associated with the values. For example, message parser 416 may rearrange the message received by BMS controller 366 such that measured values appear before predicted values, or vice versa. In some embodiments, message parser 416 can work with feedback controller 418 to optimize building performance (e.g., efficiency, energy use, comfort, or safety) based on inputs received at interface 404 and/or BMS interface 402.

Feedback controller 418 may be configured to leverage measurements to make decisions about how to manipulate the operation of BMS 400 so that BMS 400 achieves an expected or desired behavior. For example, feedback controller 418 may be able to receive inputs from message parser 416 of measured and predicted values. In some embodiments, feedback controller 418 does not need to know whether the values are measured or predicted. For example, an existing system may be able to interact with wireless device 408 without being significantly altered, or altered at all, by receiving both measured and predicted values at regular intervals without being informed of the type of each value. Feedback controller 418 may use the measured and/or predicted values as inputs to a control algorithm as if all of the values were measured. This may provide savings to consumers by reducing the amount of reconfiguration and reinstallations needed.

Wireless Device Transmission Timing

Battery life is a critical competitive concern, and it is necessary to investigate methods to extend the effective battery life of wireless devices. The estimated battery life of wireless devices must be known with some reasonable level of confidence in order for sales teams to engage customers, quote wireless product offerings, and estimate battery replacement intervals appropriately. A wireless device may include a radio for communication, which may communicate measurements to the controller. In many cases, the radio transmissions consume the most power during operation. Some device radios have battery life of two years or less, which is generally an insufficient amount of time for some consumers. Extending the battery life may result in a more competitive product for customers desiring a longer battery life.

Existing designs involve the radio of a wireless device transmitting one message every one or two minutes. In some embodiments, the wireless communications protocol used is ZigBee. In other embodiments, communications protocols may include WiFi, Bluetooth, NFC, etc. Such frequent transmissions may drain the battery of a wireless device within two years. Previously proposed strategies require changing the controller algorithm, and may reduce the integrity of the controller. In some embodiments, the measured variable may be zone temperature; if the time between transmissions is extended too much, the comfort of an occupant of a zone controlled by the controller may be impacted. For example, if the time between transmissions is increased to five minutes, an occupant of a room may be forced to endure uncomfortable conditions for five minutes before the system acknowledges a change in temperature. In other embodiments, the measured variable is the same as the controlled variable. In some embodiments, the controlled variable may be temperature, humidity, etc. The measured variable and controlled variable are not limited to those specifically enumerated.

The present disclosure describes a system and method which uses measurements and past data to predict the next measurement with accuracy. The radio of the wireless device may transmit a message containing the current measurement and one or more predicted measurements. The controller may receive and use the measurements without any change to its algorithm. For example, the controller may include a message parser that extracts multiple values from a single message and provides the extracted values as inputs to the control algorithm over a period of time (e.g., one value at the beginning of each controller update interval). In some embodiments, the wireless device sends a new message to the controller when a measurement is made that is inconsistent with a previously-predicted measurement (e.g., different from the previously-predicted measurement by an amount exceeding a threshold, changing at a rate exceeding a threshold, etc.).

Many existing methods require changes to the control algorithm. In some embodiments, the systems and methods described herein allow the controller to function in the same way using the same algorithm with minimal, but acceptable, loss of control integrity. An acceptable loss of control integrity may be a predefined margin of error. The sensor side, or portion of the system containing the sensor, may perform multiple measurements (which typically does not consume as much power as multiple transmissions) and send one message that contains highly accurate predictions based on the measurements and past data. In some embodiments, the controller receives a measurement value at regular intervals consistent with those used in previous methods, and the control algorithm used by the controller may not change. Fewer transmissions may result in less power used by the wireless device. It is expected that battery life can be extended significantly by employing the systems, methods, and devices of the present disclosure.

Transmission System Architecture

Figure 5A:
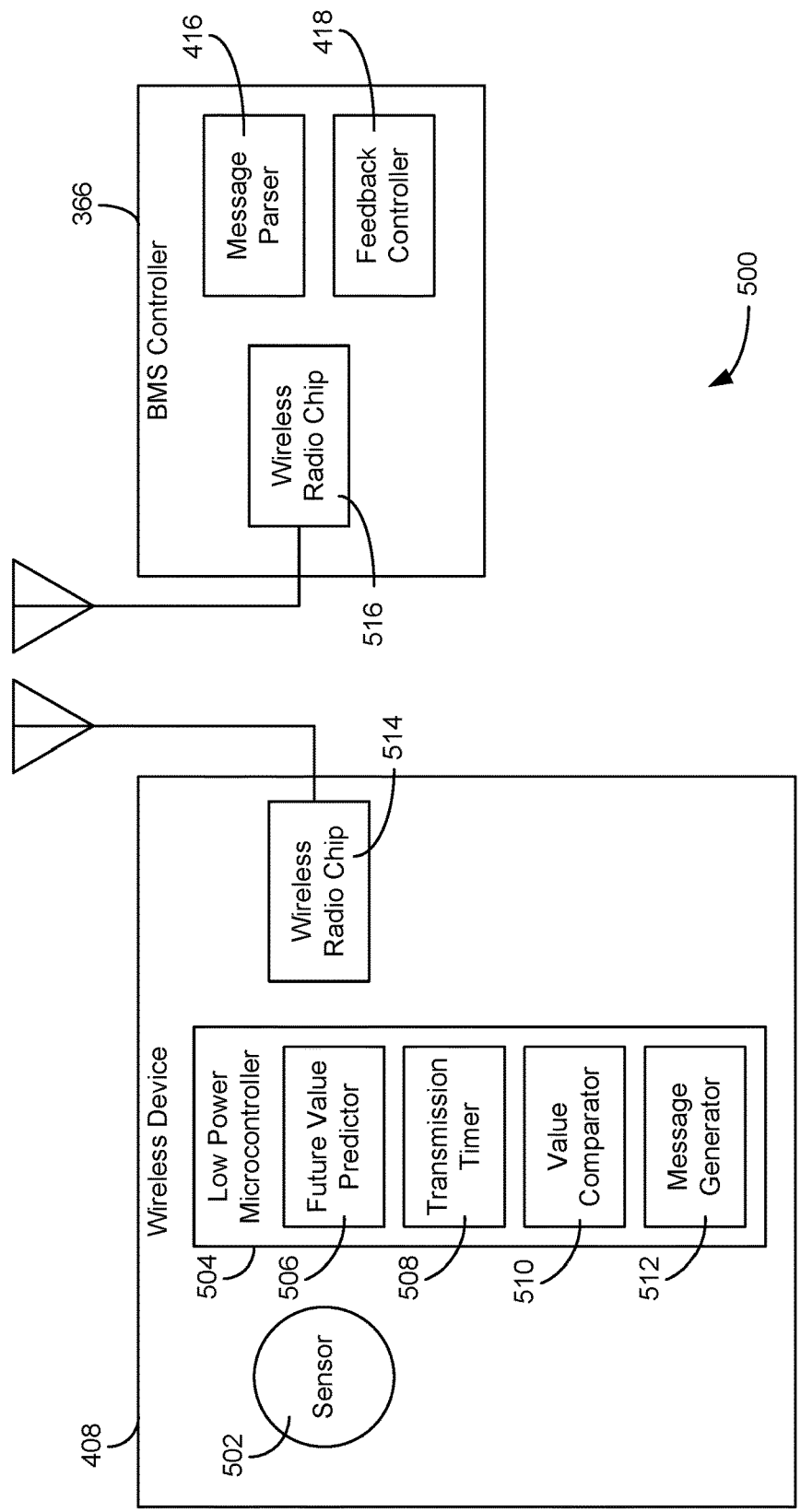
FIG. 5A is a detailed block diagram of the wireless device and building management system controller of FIG. 4, according to an exemplary embodiment.
Figure 5B:
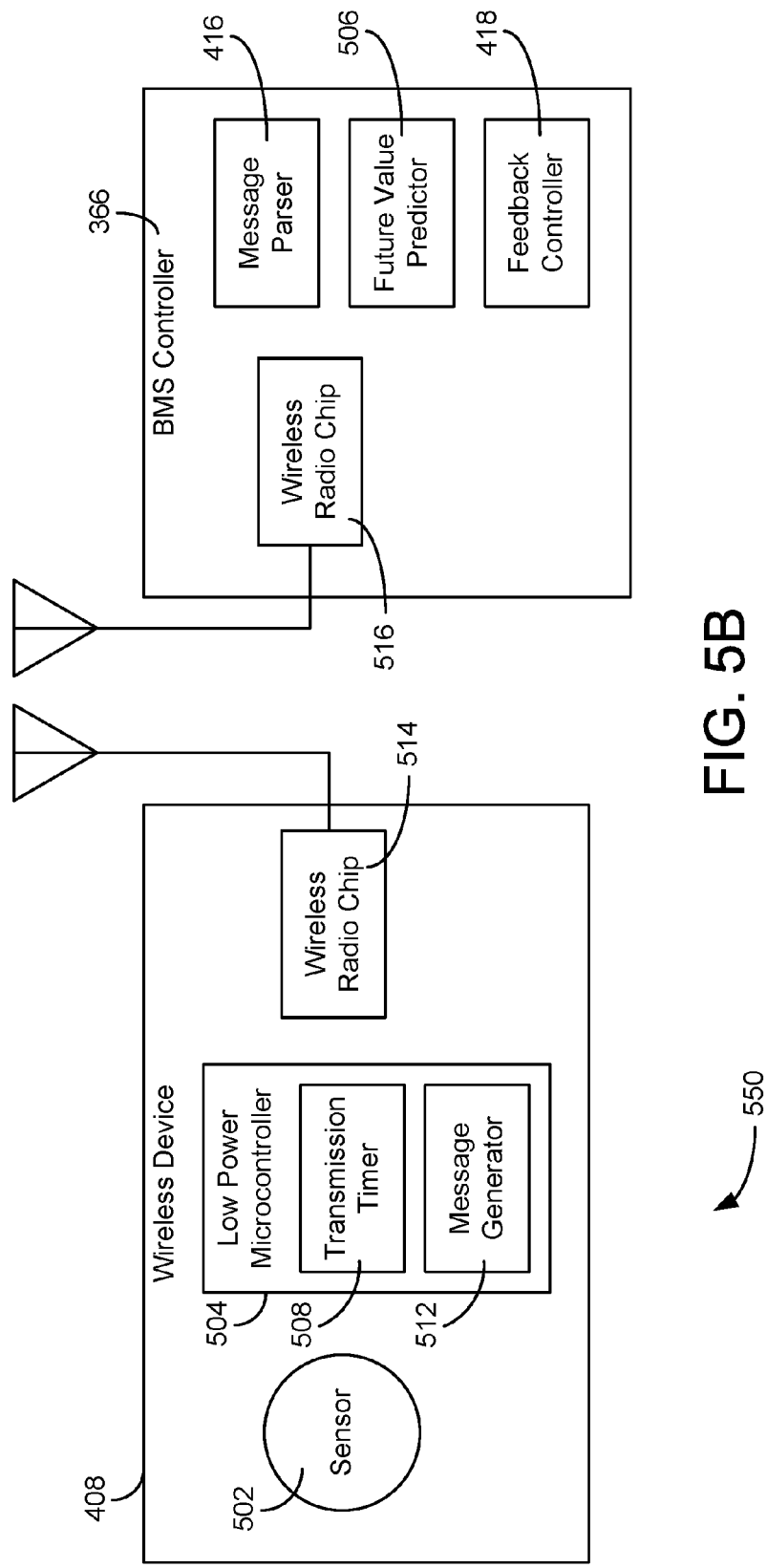
FIG. 5B is a detailed block diagram of the wireless device and building management system controller of FIG. 4, according to another exemplary embodiment.

Referring now to FIGS. 5A-5B, systems 500 and 550 for wirelessly transmitting data values of a measured variable are shown, according to two exemplary embodiments. The transmitted data values may include measured values, predicted values, or any combination thereof. Systems 500 and 550 are shown to include wireless device 408 and BMS controller 366. Wireless device 408 is shown to include a sensor 502, a low-power microcontroller 504, and a wireless radio chip 514.

Sensor 502 may measure a variable of interest and provide measured data values to low-power microcontroller 504. Sensor 502 may be a temperature sensor, humidity sensor, enthalpy sensor, pressure sensor, lighting sensor, flow rate sensor, voltage sensor, valve position sensor, load sensor, resource consumption sensor, and/or any other type of sensor capable of measuring a variable of interest in BMS 400. In some embodiments, sensor 502 includes a plurality of sensors, and wireless device 408 may generate multiple messages or generate one message, each containing measurements (both measured and predicted) for multiple measured variables. In some embodiments, sensor 502 is a single sensor and wireless device 408 may generate a single message containing multiple measurements (measured and predicted) containing data for the singular measured variable.

Sensor 502 may be any battery-operated sensor, such that sensor 502 does not need an external power source. In some embodiments, sensor 502 receives power from a battery within wireless device 408. In other embodiments, sensor 502 may use any power source such as chemical, solar, biological cells, etc. In some embodiments, sensor 502 may utilize an external power source, and may be connected to the power source via a wired connection. In other embodiments, sensor 502 may utilize technology such as wireless charging.

Sensor 502 may collect data values continuously at regular intervals. For example, sensor 502 may collect temperature data in a particular zone of a building every minute. In some embodiments, sensor 502 may collect multiple values for multiple variables at the same time, or at different frequencies. For example, sensor 502 may be a combination sensor, and may collect air temperature data every minute and local humidity every five minutes. The length of time between data collections by sensor 502 is referred to herein as the measurement period and/or the measurement interval.

Low-power microcontroller 504 may generate a message containing one or more values of the measured variable and, in some embodiments, one or more predicted values of the measured variable. Low-power microcontroller 504 may be any controller component capable of processing data. For example, microcontroller 504 may include a processing circuit containing a processor capable of receiving, processing, and outputting data. In some embodiments, microcontroller 504 may contains memory capable of storing data. In other embodiments, microcontroller 504 may not include a memory. Various embodiments of low-power microcontroller 504 are described in greater detail below. Low-power microcontroller 504 provides the message to wireless radio chip 514, which wirelessly transmits the message to BMS controller 366.

BMS controller 366 is shown to include a wireless radio chip 516, a message parser 526, and a feedback controller 418. Wireless radio chip 516 receives messages from wireless radio chip 514 of wireless sensor 408 and provides the messages to message parser 416. Message parser 416 extracts individual data values from the message and provides the data values to feedback controller 418. Feedback controller 418 uses the data values as inputs to a control algorithm to generate a control output (e.g., a control signal for building equipment that operate to affect the measured variable). In some embodiments, BMS controller 366 includes some or all of the features described with reference to FIGS. 3-4. In some embodiments, systems 500 and 550 may include more, fewer, and/or different components than those specifically shown in FIGS. 5A-5B.

Referring particularly to FIG. 5A, system 500 is shown, according to an exemplary embodiment. In system 500, one or more future values of a measured variable are predicted by wireless device 408, combined into a single message along with a current value of the measured variable, and transmitted to BMS controller 366 wirelessly. In system 500, low-power microcontroller 504 is shown to include a future value predictor 506, a transmission timer 508, a value comparator 510, and a message generator 512. The functions of these components are described in greater detail below.

Future value predictor 506 may be a module of microcontroller 504. In some embodiments, future value predictor 506 may be a memory module which may contain instructions to be executed by a processor of microcontroller 504. Future value predictor 506 may use measured values obtained by sensor 502 to predict future values of the measured variable. In some embodiments, future value predictor 506 may be implemented in hardware, as a circuit. In other embodiments, future value predictor 506 may be implemented in software, as computer-executable code. Future value predictor 506 may be implemented as any combination of hardware and software. Any module in the present disclosure may be implemented as solely hardware, solely software, or a combination of hardware and software.

Future value predictor 506 may use a prediction model to predict one or more future values of the measured variable with accuracy over a prediction horizon (how far ahead a model predicts the future) or prediction period of a predetermined length. In some embodiments, the chosen model may be developed to predict over a short horizon to ensure frequent inputs of data values to feedback controller 418. The chosen model may be of low order to reduce computational complexity and thus processing time and power consumption. In some embodiments, the chosen model may be adaptive to handle a variety of starting conditions and situations. For example, a model may be designed to handle building zones with different air volumes.

Future value predictor 506 may use the chosen model to develop a model-based predictive algorithm of low computational complexity. In some embodiments, the algorithm may filter out noise in received data. The predictive algorithm may be executed by low-power microcontroller 504 to predict future values for input to feedback controller 418. In some embodiments, future value predictor 506 executes the predictive algorithm. In some embodiments, the algorithm may be designed to have low computational complexity to ensure real-time execution using low-power microcontroller 504 which may have limited computation and memory resources. An exemplary model and algorithm are described in more detail in the discussion of FIGS. 9A and 10A.

Referring still to FIG. 5A, transmission timer 508 may be a module of low-power microcontroller 504 configured to monitor and control timing of wireless transmissions from device 408. In some embodiments, transmission timer 508 monitors and controls timing of wireless transmissions to BMS controller 366. Transmission timer 508 may be configured to identify or determine a transmission period and/or transmission interval for wireless device 408 based on the original transmission interval used by feedback controller 418. As defined herein, the transmission interval may be the time that elapses between transmissions from wireless device 408. In some embodiments, the transmission interval is longer than the controller update interval used by feedback controller 418. For example, if the controller update interval used by feedback controller 418 is one minute, the transmission interval may be four minutes. The controller update interval may be the period of time between iterations of the control algorithm used by feedback controller 418. At the beginning of each controller update interval, feedback controller 418 may be provided an updated input value. In other embodiments, the transmission interval is equal to the controller update used by feedback controller 418.

The transmission interval may be determined by wireless device 408 to provide a compromise between power savings and accuracy of the prediction values output by device 408. In some embodiments, the transmission interval is determined by transmission timer 508, and the predicted values are determined by future value predictor 506. Transmission timer 508 may adjust a transmission interval of wireless device 408 based on instructions from value comparator 510. For example, the regular transmission interval may be shortened if value comparator 510 determines that a predicted value for a given time is significantly different than an actual measured value for the given time and/or if the measured value has changed at a rate exceeding a predetermined threshold.

The controller update interval may be shorter than the transmission interval such that multiple controller update intervals occur within a single transmission interval. In other embodiments, the controller update interval may be the same as the transmission interval. In some embodiments, the controller update interval may be no longer than one-tenth of the time constant of the controlled system. In other embodiments, the controller update interval may be any length of time (e.g., one-half, two-thirds, two times the time constant, etc.) of the controlled system. The time constant of the controlled space may characterize the frequency response of the system. For example, the time constant of a system may be 20 minutes; the controller update interval may be onetwentieth the time constant, or one minute. In some embodiments, the update interval is determined based on user or occupant preference. For example, a user may prefer for the controller update interval to be shorter to keep up with constantly changing conditions and maintain occupant comfort. A user may set the controller update interval to be longer to conserve battery life of wireless device 408 which may need to transmit more frequently with a shorter update interval.

Referring still to FIG. 5A, low-power microcontroller 504 is shown to include value comparator 510. Value comparator 510 may be a module of microcontroller 504 configured to compare values of the measured variable. In some embodiments, value comparator 510 may compare a previously-predicted value for a particular time to an actual measured value at that time and make an operating decision based on the result of the comparison. For example, value comparator 510 may compare a previously-predicted value to an actual measured value to determine a difference between the predicted and measured values. In some embodiments, value comparator 510 compares multiple measured values at different times to determine a rate of change. The difference and/or rate of change may be used to make operating decisions. For example, if the difference and/or rate of change is larger than a predetermined threshold, wireless device 408 may send a new measured value to BMS controller 366 before the beginning of the next transmission interval.

In some embodiments, value comparator 510 may communicate with transmission timer 508 to transmit a measured value before the beginning of the next transmission interval to BMS controller 366 based on a calculated rate of change. For example, if value comparator 510 determines that the rate of change of the zone temperature is larger than a predetermined threshold, value comparator 510 may communicate with transmission timer 508 to send a measured value before the beginning of the next transmission interval. In some embodiments, wireless device 408 may make control decisions based on the difference between a predicted value at a time and its measured value at that time. For example, value comparator 510 may calculate the difference between the predicted value and the measured value of a flow rate, and upon determining that the difference is larger than a predetermined threshold value, may communicate with transmission timer 508 to send a measured value to BMS controller 366 before the beginning of the next transmission interval.

Still referring to FIG. 5A, low-power microcontroller 504 is shown to include message generator 512. Message generator 512 may be a module of microcontroller 504 configured to generate a message for transmitting from device 408. In some embodiments, message generator 512 may generate a message which contains one or more measured values and one or more predicted values of a measured variable for transmitting from device 408 to BMS controller 366. In some embodiments, messages include indicators for whether a value is a measured or predicted value. For example, message generator 512 may generate a message including one measured value and three predicted values. The predicted values may be marked by a flag or attribute to indicate to BMS controller 366 that the values are predicted values. In other embodiments, message generator 512 may not mark different values, and may not inform BMS controller 366 whether a value is measured or predicted.

In some embodiments, message generator 512 generates messages with only measured values, only predicted values, or a combination of measured and predicted values. Message generator 512 may generate messages such that included values are sequential. In some embodiments, message generator 512 may generate messages with indicators for the order in which the values should be read. For example, a message may be a data packet containing one measured value and multiple predicted values, each with a header indicating its status (measured or predicted) and its temporal order. In other embodiments, message generator 512 may generate messages with the values in the order in which each value is to be read and/or applied as an input to feedback controller 418.

Message generator 512 may generate messages such that no changes need to be made to the control algorithm of BMS controller 366 in order to receive the messages. In some embodiments, message generator 512 may generate messages such that few changes need to be made to the control algorithm of BMS controller 366 in order to receive the messages. Message generator 512 may generate messages with commands or control data for transmitting to BMS controller 366.

Still referring to FIG. 5A, wireless device 408 and BMS controller 366 are shown to include wireless radio chips 514 and 516. In some embodiments, the wireless communications protocol used is ZigBee. Other communications protocols include WiFi, Bluetooth, NFC, etc. In some embodiments, other communications interfaces and components may be included, such as a wired connection. Wireless radio chips 514 and 516 may contain transceivers capable of transmitting and receiving data through an antenna. Wireless radio chips 514 and 516 may be different chips and may use different hardware while using the same wireless communications protocol. Wireless radio chips 514 and 516 may operate using any frequency interface, such as RF. Chips 514 and 516 may use frequencies outside of the RF range, and may not be radio chips. In some embodiments, chips 514 and 516 may communicate using other frequency ranges, such as IR. Chips 514 and 516 may utilize any communications interface, and are not limited to those specifically enumerated.

Still referring to FIG. 5A, BMS controller 366 is shown to include message parser 416 and feedback controller 418. These components may be the same or similar as previously described with reference to FIG. 4. For example, message parser 416 may parse messages generated by message generator 512 and received by BMS controller 366. In some embodiments, messages are received directly by message parser 416. Message parser 416 may communicate with feedback controller 418. In some embodiments, message parser 416 parses a message, extracts a plurality of data values from the message, and provides the data values to feedback controller 418 at regular intervals.

Message parser 416 may receive messages at the transmission interval, which may be longer than the controller update interval. Message parser 416 may parse the messages to extract a data value for each controller update interval within the transmission interval. For example, message parser 416 may receive a message with six values: one measured value and five predicted values. Message parser 416 may extract the six values from the message and provide one of the values to feedback controller 418 at the beginning of each controller update interval. Feedback controller 418 may receive inputs from message parser 416 to make control decisions for BMS controller 366. In some embodiments, feedback controller 418 generates control data and provides the control data BMS subsystems 420 (e.g., directly or via BMS interface 404).

Referring now to FIG. 5B, system 550 is shown, according to an exemplary embodiment. System 500 is shown to include many of the same components as system 500 of FIG. 5A. Reused reference numbers indicate similar components. In system 550, future values of the measured variable are predicted by BMS controller 366 and therefore future value predictor 506 may be included in BMS controller 366 rather than wireless device 408. Wireless device 408 is shown to include, in the exemplary embodiment of FIG. 5B, transmission timer 508 and message generator 512. Message generator 512 may generate messages containing one or more values of the measured variable. In some embodiments, the messages include a single value of the measured variable. In other embodiments, the messages include multiple values of the measured variable. Wireless radio chip 514 may transmit the messages to BMS controller 366 at the transmission interval.

BMS controller 366 is shown to include message parser 416, future value predictor 506, and feedback controller 418. In some embodiments, message parser 416 receives messages from wireless device 408 and parses messages into values for inputting to feedback controller 418. The values may pass through future value predictor 506 before being input to feedback controller 418. Future value predictor 506 may predict values, using the values parsed out by message parser 416, for the measured variable to pass to feedback controller 418.

In some embodiments, messages received by message parser 416 contain multiple measured values (i.e., past values of the measured variable) which are passed to future value predictor 506, and future value predictor 506 may predict values in the future using the multiple measured values. In other embodiments, messages received by message parser 416 contain one measured value which is passed to future value predictor 506, and future value predictor 506 may predict values in the future using the single measured value. Future value predictor 506 may predict values one at a time for inputting to feedback controller 418. In some embodiments, future value predictor 506 may predict values each control interval within a horizon of a predetermined duration. In some embodiments, the prediction horizon begins at the current time and ends at the control interval before a new transmission is scheduled to be received. For example, if the transmission interval is every four minutes, the prediction horizon may be three minutes. This allows future value predictor 506 to predict future values for each control interval for which a value of the measured variable is not received from wireless device 408.

Processes for Predicting Future Measurements

A wireless radio chip in a wireless device may use significantly less power when receiving data from a low-power microcontroller than it does when it is transmitting a message to a feedback controller. Multiple values may be sent to a controller in a single message each time the wireless device transmits, reducing the number of transmissions needed. By incorporating advanced algorithms for predicting future values accurately, the proposed systems and methods of the present disclosure may increase a transmission interval and conserve power.

In some embodiments, a message sent to a feedback controller may contain the current measured value and multiple predicted values of a measured variable. The predicted values may be based on multiple measurements and past values stored in memory. In some embodiments, one message is sent each transmission interval. If a change of value occurs, it may trigger a new message to be sent to the controller with updated values. The controller update interval and the wireless device transmission interval may not be equal in some implementations. Instead, a message parser on the controller side may provide the feedback controller with one value from the message each update interval. In some embodiments, there is no need to change the implementation or algorithm of the controller—actual values and predicted values may be formatted and handled the same with no indicated difference between the two.

One advantage of the proposed method results from providing future values to the feedback controller. A system may be able to maintain the same responsiveness without sacrificing battery life. For example, a building management system may be able to maintain occupant comfort by maintaining a controller update interval of every minute while only receiving messages every four minutes. Better resolution of measurements may be available without transmitting values every controller update interval. There are two limiting factors to the length of the transmission interval: the accuracy of the algorithm, which determines the prediction horizon; and the power consumed by the wireless device in taking measurements and running the algorithm. Fewer transmissions means less power used by the wireless device. It is expected that battery life can be extended significantly by employing the systems, methods, and devices of the present disclosure.

Figure 6:
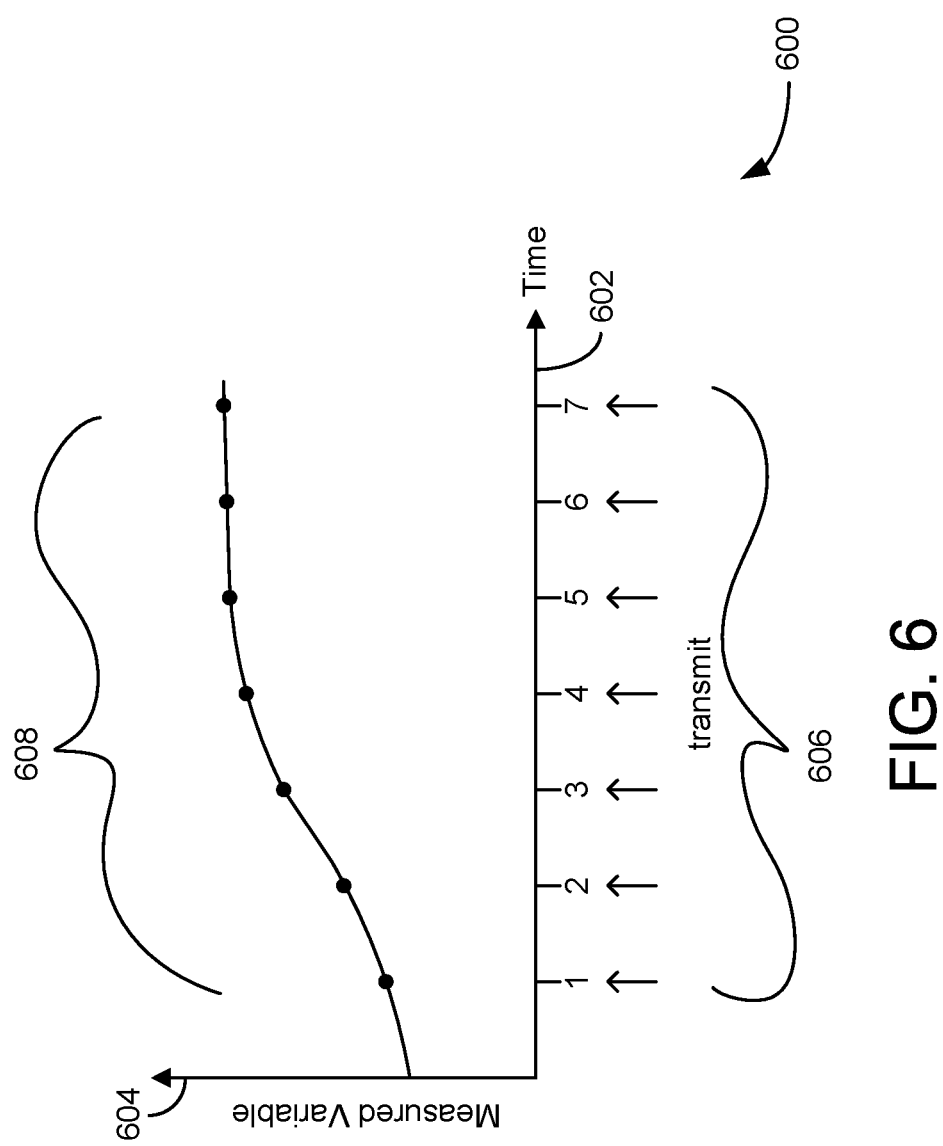
FIG. 6 is a graph illustrating an existing wireless transmission timing process, according to an exemplary embodiment.

Referring now to FIG. 6, a graph 600 illustrating an existing wireless transmission technique is shown, according to an exemplary embodiment. X-axis 602 is shown to be time. In some embodiments, the units are minutes and the transmissions 606 are shown to occur every minute. Y-axis 604 is shown to be the value of the measured variable. The data contained in each transmission may be measured values 608 of the measured variable. Graph 600 shows the interval at which a wireless device may transmit messages to a controller. In some embodiments, one measured value is received per transmission and the transmission interval is the same as the controller update interval (i.e., one measurement and transmission per minute). Many existing methods use a one-to-one ratio of transmissions and measured values, consuming large amounts of power in transmission.

Figure 7:
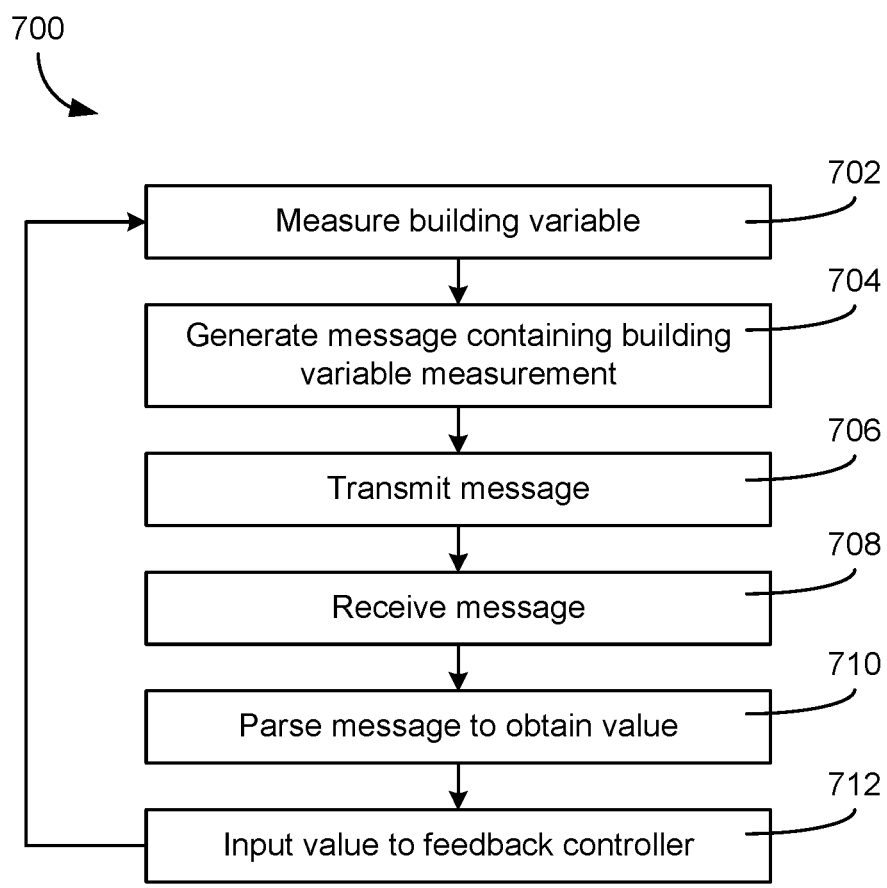
FIG. 7 is a flowchart of the existing wireless transmission timing process of FIG. 6, according to an exemplary embodiment.

Referring now to FIG. 7, a process 700 illustrating the existing wireless transmission technique of FIG. 6 is shown, according to an exemplary embodiment. Process 700 begins with step 702, in which the chosen building variable, or measured variable, is measured. Step 702 may be performed by a wireless device which may contain a sensor. In some embodiments, the sensor may be wireless or it may require a wired connection. The process continues with step 704, in which a message is generated containing a single measurement of the building variable. The message may be generated by the wireless device, and in some embodiments, may be generated by a microcontroller or module of the microcontroller in the wireless device.

The message may then be transmitted in step 706. In some embodiments, the message is transmitted wirelessly to a controller. The controller may receive the message in step 708. In some embodiments, the controller may include a microcontroller which may parse the message in step 710 to obtain a value which may be input to a controller. The controller may include a feedback controller which makes control decisions based on input received from the wireless device. Process 700 continues with step 712, in which the value obtained in step 710 is input to the feedback controller. In many existing methods, process 700 repeats by going back to step 702. Transmissions may commonly be made with one value, requiring one transmission per controller update interval.

Figure 8:
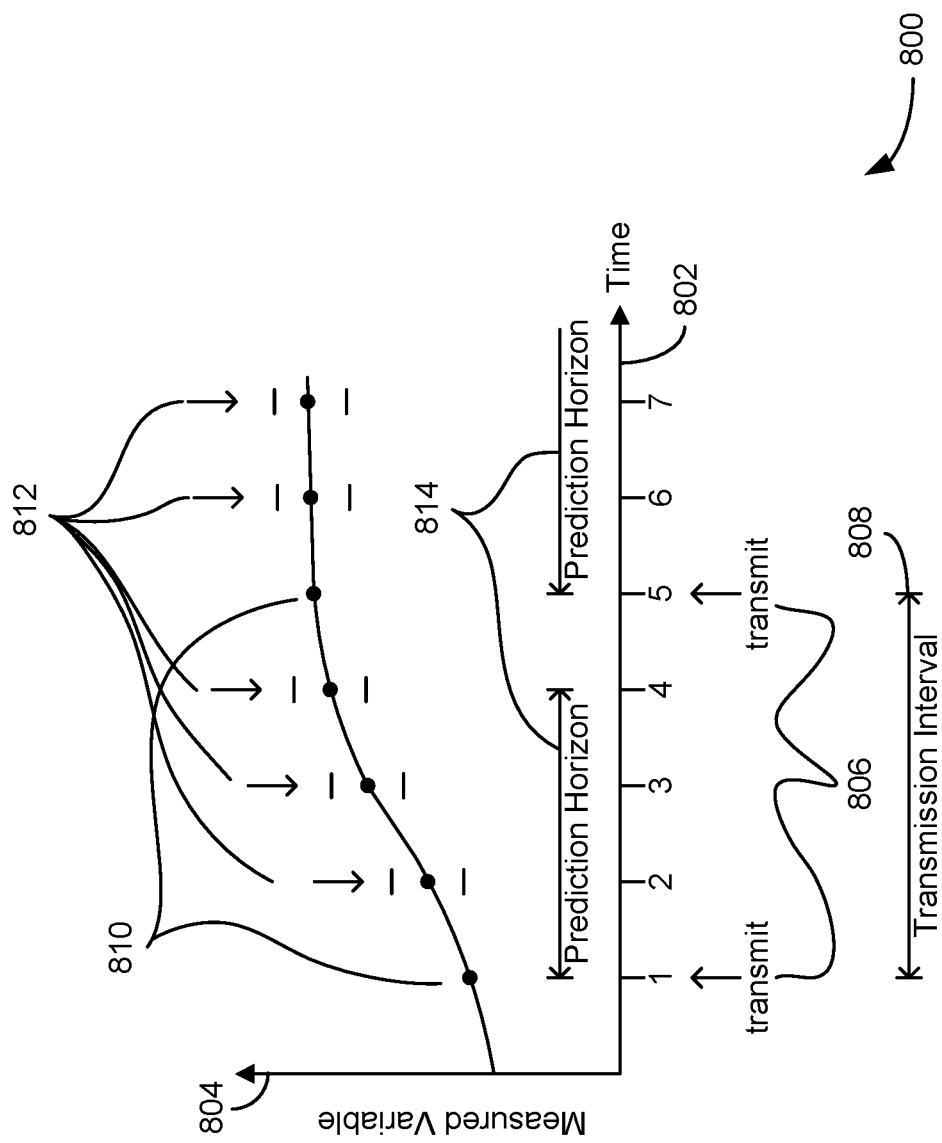
FIG. 8 is a graph illustrating a proposed wireless transmission timing process, according to an exemplary embodiment.

Referring now to FIG. 8, a graph 800 illustrating a new wireless transmission technique is shown, according to an exemplary embodiment. X-axis 802 is shown to be time. In some embodiments, the units are minutes and the transmissions 806 are shown to occur at regular intervals of four minutes. In other embodiments, transmissions 806 may occur at any regular interval, such as every two, seven, fifteen, etc., minutes. The time that elapses between transmissions is referred to herein as transmission interval 808. In some embodiments, transmissions 806 may occur at irregular intervals.

Still referring to FIG. 8, y-axis 804 is shown to be the value of the measured variable. The data contained in each transmission may include one or more measured values 810 of the measured variable and one or more predicted values 812. Each of predicted values 812 is shown to include bars which may indicate a confidence interval or uncertainty for each value. The level of confidence may be chosen by a user, or may be selected automatically by the system based on user inputs and preferences for reactiveness to changes in the system. For example, a user may desire a lower confidence level of 80% for a system controlling the temperature in an unoccupied zone of a building, while he may choose a confidence level of 95% for a system controlling the humidity in a laboratory setting. The confidence level may affect the computational complexity of the selected algorithm used to predict predicted values 812, and decisions regarding the confidence level may be made by a user or the system based on the amount of power or computational time required to deliver such a confidence level.

In some embodiments, the bars may represent a margin of error which is acceptable. In other embodiments, the bars may represent upper and lower thresholds for values. For example, an alarm may be activated if it is determined that a later measured value 810 at the time of a predicted future value 812 is outside of one of the threshold values. A measured value 810 may be sent to the feedback controller prior to the beginning of the next transmission interval if a later measured value 810 at the time of a predicted future value 812 is outside of one of the threshold values.

Still referring to FIG. 8, in this exemplary embodiment, graph 800 shows transmissions 806 occurring at time 1 and time 5. Graph 800 shows measured values 810 at time 1 and time 5 and predicted values 812 at times 2-4 and times 6-7. The transmission interval has been extended from the one minute interval shown in FIG. 6 to four minutes (i.e., one transmission every four minutes). At time 1, a message may be sent containing the actual measured value 810 and three predicted future values 812. The values at times 2, 3, and 4 may be estimated and may be able to tolerate a slight variation from the actual value, indicated by the bars indicating the confidence interval.

A sensor may measure the measured variable at the beginning of each measurement interval (e.g., once per minute) and run the prediction algorithm. A message may then be sent once per transmission interval (e.g., every four minutes). Each message may include a measured value and one or more predicted values of the variable of interest. For example, the message generated at time 1 may include the actual value measured at time 1 as well as predicted values for times 2-4. The message generated at time 5 may include the actual value measured at time 5 as well as predicted values for times 6-8. The interval between a measured value and the most distant predicted value is shown as the prediction interval. In other words, the prediction interval defines how far in advance predictions are made. For example, graph 800 is shown to include a prediction interval of three minutes, extending from time 1 to time 4.

A new message may be generated and sent at the beginning of each transmission interval. However, it is contemplated that a new message may also be generated and sent if a change in value is detected. A change in value may include, for example a substantial difference between a measured and predicted value for a given time (e.g., a difference in excess of a threshold), a measured value that lies outside a threshold for a predicted value, a rate of change that exceeds a threshold, or other changes in a measured value relative to a previously-predicted or previously-measured value.

A model-based predictive sensing algorithm for feedback control is described in the present disclosure. In some embodiments, no change is made to the controller update interval of the feedback controller. The feedback controller may be executed as if it were to receive a measurement at each time step required for acceptable control performance. The transmission intervals between the wireless device and the controller may be increased to be a multiple of the controller update rate of the controller (e.g., one transmission per four controller update intervals of the controller). To provide the feedback controller with measurement values between transmissions, the wireless device may also transmit predicted values of the future measurements to the feedback controller.

Figure 9B:
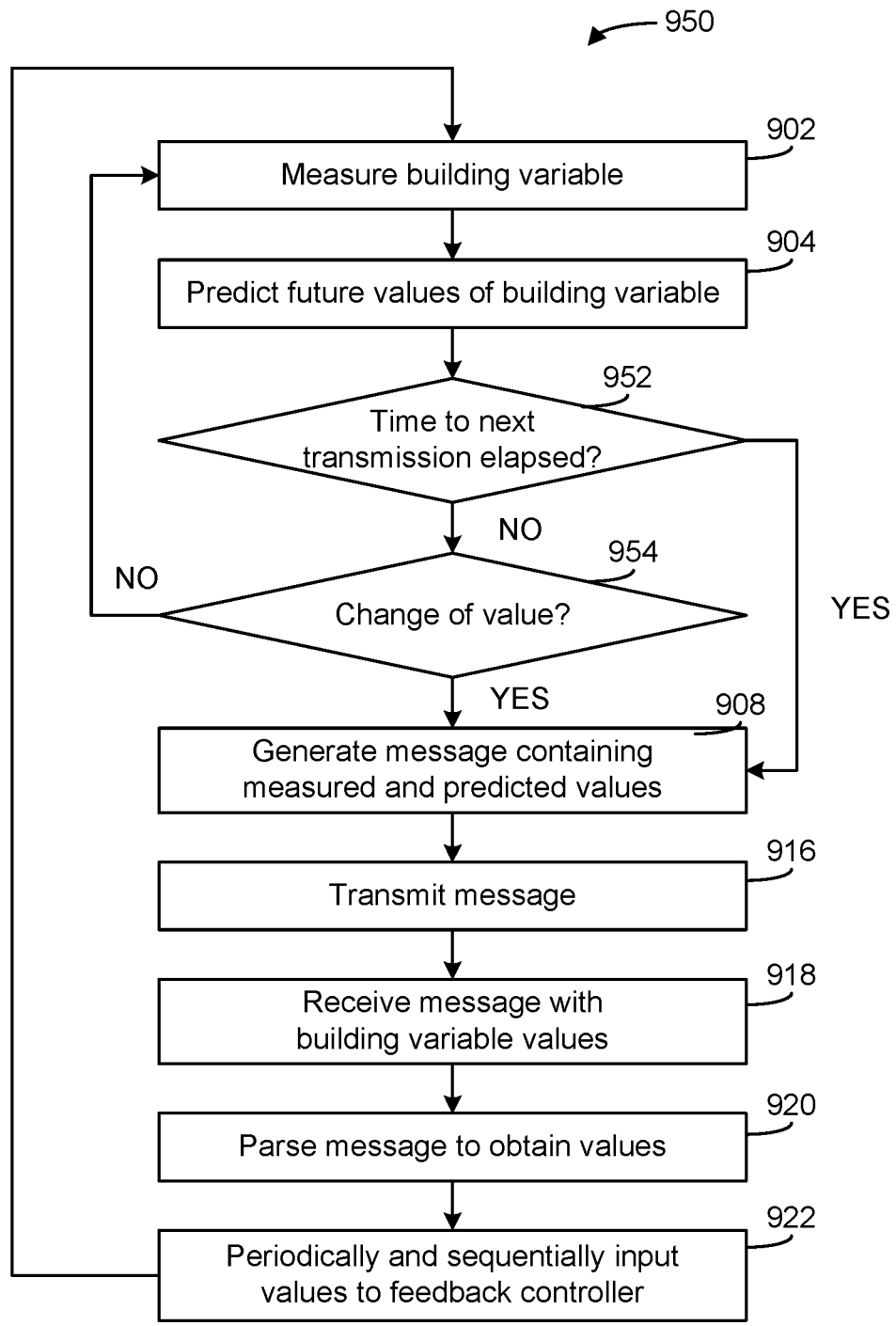
FIG. 9B is a flowchart of the new wireless transmission timing process which may be performed by the system of FIG. 4, according to an exemplary embodiment.

Referring now to FIGS. 9A-9B, a system 900 and process 950 for the proposed wireless transmission timing method which may be performed by the system of FIG. 4 are shown, according to an exemplary embodiment. System 900 and process 950 may include step 902, in which one or more values of a building variable are measured. In some embodiments, step 902 may be performed by wireless device 408. Referring to FIGS. 5A and 9A-9B, step 902 may be performed by sensor 502. In some embodiments, step 902 is executed by another component of wireless device 408 which may not be shown. The measurement interval (i.e., the time between consecutive measurements) may be shorter than the transmission interval (i.e., the time between consecutive transmissions) or equal to the transmission interval. For example, samples of the measured variable may be obtained every minute, whereas a transmission may occur every four minutes.

System 900 and process 950 may continue with step 904 in which future values of the building variable (or measured variable) are predicted. In some embodiments, step 904 is performed by wireless device 408. Step 904 may be performed by low-power microcontroller 504, or a component of low-power microcontroller 504. In some embodiments, step 904 is performed by future value predictor 506 of wireless device 408. The algorithm for predicting the future value may use any prediction method. In some embodiments, filters, such as a Kalman filter may be used to predict future values of the measured variable. In other embodiments, deterministic and stochastic models are used. Autoregressive models may be used to predict future values of the measured variable. Exemplary models and algorithms are described later in the present disclosure.

In step 906, wireless device 408 may determine whether to generate a message. In some embodiments, wireless device 408 decides to generate a new message when a change in value occurs (e.g., when an error between a predicted value and a later-measured value for the same time exceeds a threshold, when a rate of change of the measured values a threshold, etc.). In some embodiments, the generation of a new message leads to the transmission of the new message. The transmission of a new message may begin a new transmission interval. For example, a transmission interval may be four minutes long, and may span time 1 to time 5. If a change of value is detected at time 3, a new transmission interval may begin at time 3 and span time 3 to time 7. In some embodiments, if a user makes a change to the system, a new message may be generated. For example, if a user changes a setpoint or a setting of the system, a new message may be generated for transmittal to the feedback controller.

The time constant of a system may change, making predictions inaccurate. For example, the frequency response of a temperature control system may change due to a change in occupancy of a particular zone. In some embodiments, the system retunes and/or redefines the prediction algorithm if an error commonly occurs or if an error occurs too often (e.g., at a rate in excess of a predetermined limit or threshold). In other embodiments, the system retunes and/or redefines the prediction algorithm if new messages are sent too often or corrections need to be made too often. For example, if a new message is being sent twice in twenty controller update intervals, the system may retune the prediction algorithm. Retuning can occur periodically and automatically. For example, retuning of the algorithm may occur every five (or any other number) of controller update intervals. In some embodiments, retuning occurs based on conditions such as a frequency of errors. For example, if an error is detected three times in ten controller update intervals, retuning of the prediction algorithm may occur.

System 900 and process 950 may include step 908, in which a message is generated. Referring to FIGS. 5A and 9A-9B, a message 910 may be generated containing measured value(s) 912 and predicted value(s) 914. In various embodiments, measured value 912 may include a single measured value (as shown in FIG. 9A) or multiple measured values. Predicted values 914 may be a single value or multiple predicted values. In some embodiments, message 910 may contain only measured value 912 and no predicted values 914. In other embodiments, message 910 only contains predicted values 914. Message 910 may contain any combination of measured value 912 and predicted values 914.

Message 910 may be generated such that the existing controller may be used without making changes to the control algorithm. For example, message 910 may be in a format that may be read by message parser 416. In some embodiments, message 910 is generated such that changes may need to be made to the control algorithm. Message 910 may be generated in a format which may not be directly input to the controller. In some embodiments, the controller is BMS controller 366. In other embodiments, the controller is a component of BMS controller 366, such as feedback controller 418. Message 910 may be parsed by message parser 416 such that the processed values may be input directly to feedback controller 418.

Referring still to FIGS. 9A-9B, system 900 and process 950 may include step 916 in which message 910 is transmitted to the controller. In some embodiments, the controller is BMS controller 366 or feedback controller 418. Step 916 may occur through the use of wireless radio chips 514 and 516 of FIG. 5A. In some embodiments, transmission step 916 occurs wirelessly over wireless communications protocols such as ZigBee, WiFi, Bluetooth, NFC, etc. In other embodiments, transmission step 916 may require a physical connection or a wired connection.

System 900 and process 950 may further include step 918, in which message 910 is received at the controller. In some embodiments, message 910 is transmitted from wireless device 408 and is received by BMS controller 366. Message 910 may be transmitted through wireless radio chip 514 and received wireless radio chip 516. In some embodiments, message 910 may be received by a component of BMS controller 366.

System 900 and process 950 may further include step 920, in which message 910 is parsed to obtain values. In some embodiments, step 920 is performed by BMS controller 366. In other embodiments, step 920 is performed by a component of BMS controller 366 such as message parser 416. Message parser 416 may parse message 910 to separate each value for sequential input to feedback controller 418. For example, message parser 416 may separate measured value 912 for input to BMS controller 366, then each of predicted values 914. In some embodiments, message 910 contains indicators for the order in which the values are to be input to feedback controller 418. In other embodiments, message parser 416 may input values to feedback controller 418 in the order the values are arranged in message 910.

Still referring to FIGS. 9A-9B, system 900 and process 950 may include step 922, in which the values parsed in step 920 may be periodically and sequentially input to a feedback controller. In some embodiments, the feedback controller is feedback controller 418. Values may be measured value 912 and/or predicted values 914. In some embodiments, the values are marked by indicators with whether each value is measured or predicted. For example, a value received by feedback controller 418 may be flagged as a predicted value, and may elicit additional processing in the control algorithm. In other embodiments, the values are not marked by indicators, and feedback controller 418 may not be aware of which values are measured and which are predicted. Feedback controller 418 may not be configured to handle predicted values, and in some embodiments, may not be configured to identify extraneous data that is not the value needed for the control algorithm.

Referring now to FIG. 9B, process 950 is shown to include steps 952 and 954, which may be embodiments of step 906 of FIG. 9A. Repeated figure numbers indicate similar items or steps. Process 950 may proceed from step 904 to step 952. In step 952, wireless device 408 may determine whether the transmission interval has elapsed. In some embodiments, if the time to the next transmission has elapsed, process 950 may continue with step 908. If the time to the next transmission has not elapsed, wireless device 408 may determine whether a change of value has occurred. In some embodiments, if a change of value has occurred, process 950 may continue with step 908. If a change of value has not occurred, process 950 may continue with making another measurement of measured or building variable in step 902.

In some embodiments, steps 952 and 954 are transposed. In other embodiments, steps 952 and 954 are performed in parallel. Process 950 may evaluate the outcomes of steps 952 and 954 as an OR statement, and in some embodiments, may use a logic gate to determine whether to continue. Steps 952 and 954 may be performed, in some embodiments, by components of BMS controller 366. For example, step 952, in which a determination is made as to whether the time to the next transmission has elapsed, may be performed by transmission timer 508. Step 954, in which a determination is made as to whether a change of value has occurred, may be performed by value comparator 510. In some embodiments, a separate processor or module of low-power microcontroller 504 may perform steps 952 and 954. In other embodiments, a separate component of wireless device 408 may perform steps 952 and 954.

Referring still to FIGS. 9A-9B, an exemplary embodiment may now be presented. The following example is meant to illustrate the systems and methods of the present disclosure and is not meant to be restrictive. Let $T_{s,ctrl}$ denote the execution rate (e.g., sampling time) of the feedback controller and $T_{s,comm}$ be the transmission interval at which the sensor sends the current measurement along with $N_{pred} \geq 0$ predicted future measurements, where:

$$N_{pred} = \frac{T_{s,ctrl}}{T_{s,comm}} - 1.$$

In a conventional wired feedback control loop, or under ideal sampling of a wireless feedback control loop, $T_{s,ctrl} = T_{s,comm} =: T_s$ where $T_s$ is dictated by conventional control performance requirements. In some embodiments, the case in which $T_{s,ctrl} = T_{s,comm}$, whether it be a feedback control loop utilizing a wired or wireless sensor, will be referred to as ideal sampling in what follows. $T_{s,ctrl}$ may be selected according to conventional control performance requirements (e.g., $T_{s,ctrl}$ may be one-tenth of the time-constant), and $T_{s,comm}$ (or $N_{pred}$) may be limited by the accuracy of the prediction.

The purpose of the model may be to predict the next $N_{pred}$ future measured variable values of a closed-loop system given a measurement of the system at the current time. In an exemplary embodiment, the zone temperature is controlled, and the predictive model may be used to compute predictions of the closed-loop temperature measurements at future time steps given the current temperature measurement. In some embodiments, identifying a model for use as the predictive model differs from traditional system identification. The goal may be to identify a model that can be used to predict closed-loop measurements as opposed to the goal being to identify a model capable of predicting the response of an output to a given input (i.e., open-loop model identification). With respect to the model requirements, the model should be capable of predicting the future measured variable values with sufficient accuracy over a short prediction horizon. In some embodiments, a user may desire that the computation required to complete the prediction must be relatively small. The length of the horizon and the computational complexity may be chosen by a user, or may be selected or calculated automatically by the system.

A first-order discrete-time model may be chosen as the predictive model. The predictive model may be a one-parameter model of the form of:

$$\tilde{y}(k+1) = a\tilde{y}(k) + b$$

where the index k represents the kth time step, $\tilde{y}(k)$ is the predicted measurement at time step k, a represents the model parameter, and b is the bias term of the model. The bias term may be considered an additional parameter depending on the available communication between the wireless sensor device and the feedback controller, which is discussed further below. The chosen model may be considered to be a first-order autoregressive (AR) model. Higher-order autoregressive models may also be considered to potentially improve the predictions.

The model parameter may be fit using an ordinary least-squares parameter fit with closed-loop measurement data under ideal sampling conditions ($T_{s,ctrl} = T_{s,comm}$). In some embodiments, two model fitting procedures may be considered. The first methodology may use a data-based approach to fit the model parameter, a and may use the fitted parameter along with the control loop setpoint to fit the bias term. The second methodology may use a data-based approach to fit both the model parameter, a, and the bias term, b. In both cases, the data-based parameter fitting may be completed using ordinary least-squares (i.e., solving the normal equations). Nevertheless, recursive methods could also be considered to fit these parameters.

The following paragraphs describe two exemplary model update methodologies using vector and matrix calculations. However, it should be noted that these update procedures are provided for illustrative purposes only and are not meant to restrict the scope of the present disclosure.

Exemplary Model Update Procedure I

Synchronously sampled data of the temperature measurements under ideal sampling may be collected over a time horizon of $N_{data}$ time steps. The measurement data vector or training data may be defined as follows:

$$Y_{meas} = [y_{meas}(k-N_{data}), y_{meas}(k-N_{data}+1), \ldots, y_{meas}(k)]^T$$

where $N_{data}$ is the total number of total measurements. Let $Y_{meas,1:N_{data}-1}$ be the first $N_{data}-1$ elements of $Y_{meas}$ and let $Y_{meas,2:N_{data}}$ be last $N_{data}-1$ elements of $Y_{meas}$. Let $$\bar{Y}_1 = Y_{meas,1:N_{data}-1} - y_{sp}$$

$$\bar{Y}_2 = Y_{meas,2:N_{data}} - y_{sp}$$

where $y_{sp}$ denotes the setpoint of the control loop (assuming this is available to the wireless sensor device). The model parameter a may be fit by solving the following least-squares problem:

$$\min_a \|\bar{Y}_1 a - \bar{Y}_2\|_2^2$$

which has an analytical solution given by:

$$a = \frac{\bar{Y}_1^T \bar{Y}_2}{\bar{Y}_1^T \bar{Y}_1}.$$

When $\bar{Y}_1^T \bar{Y}_1$ is small (i.e., approximately zero), which occurs when the training data is sampled when the measured variable is maintained near the setpoint, the model parameter is not updated. Instead, the previous value of the parameter may be used to prevent numerical division by a small number. In practice, this may pose few limitations on the algorithm, as the model parameter a captures the dynamic behavior. Thus, it may not be appropriate to update this parameter with data sampled while the system is at steady-state.

Continuing with the exemplary embodiment of the prediction algorithm, the bias term may be computed from a and $y_{sp}$ as followed:

$$b = (1-a) y_{sp}.$$

Using the above equation to update the bias term ensures that $y_{sp}$ is a steady-state value of the model and may prevent steady-state plant-model mismatch.

Exemplary Model Update Procedure II

In the case that the setpoint is unavailable to the wireless sensor device (e.g., the setpoint is set in the controller and cannot be communicated to the wireless sensor device) or for cases where it may be preferential to update the bias term using a data-based approach, the algorithm may be readily modified to compute the bias term using the data. Let $A:=[\overline{Y}_1 \mathbf{1}_{N_{data}-1}]$ where $\mathbf{1}_{N_{data}-1}$ is the one vector with $N_{data}-1$ elements. The modified least-squares problem may be given by:

$$\min_{a,b} \left\| A \begin{bmatrix} a \\ b \end{bmatrix} - \overline{Y}_2 \right\|_2^2$$

with a solution given by:

$$\begin{bmatrix} a \\ b \end{bmatrix} = (A^T A)^{-1} A^T \overline{Y}_2.$$

It may be straightforward to show that the 2×2 matrix $A^T A$ is (theoretically) invertible and positive definite when $\overline{Y}_1 \neq c \mathbf{1}_{N_{data}-1}$ for any scalar c. As before, when $\overline{Y}_1 \approx c \mathbf{1}_{N_{data}-1}$ for some scalar c, the data may have been sampled while the system/plant is at steady-state. The model update may be rejected and the previous model parameters may be retained. In some embodiments, due to the availability of the minimum and maximum setpoint, the bias term may be verify against the minimum and maximum setpoint.

When using the training data to update the bias term, the bias term may need to be updated every time the setpoint is updated, otherwise the model may provide biased predictions to the controller. This may lead to offset in the response of the system or poor closed-loop performance. Additionally, using the method described above to update the bias term may require that the control loop operate under ideal sampling every time the setpoint is changed. Thus, this method may not be desirable for applications with frequent setpoint changes.

After the model parameter a is computed, a verification step may be performed. For $a \in (-1, 0)$, the training data exhibits high-frequency oscillation about the setpoint with a period of oscillation about equal to the sampling time of the controller. While it is possible that such a case could happen in practice, this may represent a control loop with a poorly tuned controller (either the gain is too large causing the controller to compute aggressive control actions or the sampling time is too large). For a computed parameter of $a = \pm 1$, the model may not predict a decay in the measured output to the setpoint, and for $a=0$, the model may predict a constant value equal to the bias term. Thus, a desirable range for the parameter a may be the open interval (0,1), and if a is outside the interval, a may be manually set to be in the range or new training data may be collected to re-compute the model parameter. In some embodiments, due to the fact that the predictions may be used to compute control actions by the controller, the model can be made more conservative by decreasing the model parameter, a, which ensures that a smaller error will be provided to the controller relative to using the computed a.

In some embodiments, main components of the predictive algorithm include a wireless device and a controller. Controller 366 may send a wake-up signal to wireless device 408 and sensor 502 may measure the output. An analog to digital conversion may convert the analog signal of sensor 502 to a digital signal. The digital measurement signal may be sent to a Kalman filter/predictor to filter the measurement, which leverages the predictive model described in the previous subsection. The next steps of the predictive algorithm may depend on the operation mode of wireless device 408.

Continuing with the exemplary embodiment of the systems and methods of FIGS. 9A-9B, wireless device 408 may have two operation modes: training mode and predictive mode. In training mode, wireless device 408 may provide measurements to controller 366 under ideal sampling (i.e., communication occurs at a rate of $T_{s,ctrl}$). The filtered measurement may be sent to controller 366 and may be stored in a memory of wireless device 408. At the end of the training mode, a model update may be triggered using the stored data as the training data.

In the predictive mode, the filtered measurement from the Kalman filter may be used to initialize a multistep Kalman predictor. The Kalman predictor, leveraging the predictive model, may compute predictions of the future values at the next $N_{pred}$ time steps. The filtered measurement for the current time and the predicted values may be sent to the controller. At the next $N_{pred}$ time steps, no wake-up signal may be sent to wireless device 408. Instead, controller 366 may compute a control input on the basis of the predicted values. At each execution step of controller 366, it may be desirable (but not required) for wireless device 408 to receive measurements to update the Kalman filter.

The Kalman filter and multistep predictor is described in detail. In an exemplary embodiment, a state-space realization of the system may be as follows:

$x(k+1) = ax(k) + w(k)$ $y(k) = x(k) + v(k)$ where x(k) denotes the state at time step k, w(k) is process noise, and y(k) is the output measurement, which may be corrupted by some measurement noise, denoted by v(k). For purposes of the Kalman filter, w(k) and v(k) may be assumed to be white noise with zero mean. The variances of the process noise and measurement noise may be denoted q and r, respectively. Since the variances may be required to be estimated for this case, the variances may be estimated from the training obtained during training mode.

The Kalman filter may be given by:

$\hat{x}(k|k) = \hat{x}(k|k-1) + L(k)(y(k) - \hat{x}(k|k-1))$ where the notation $\hat{x}(j|k)$ denotes the predicted or estimated state at time step j given the measurement at time step k (i.e., the measurement y(k)). The filter gain L(k) may be updated according to the following equations:

$$\begin{aligned} L(k) &= \frac{P(k|k-1)}{P(k|k-1)+r}, \\ P(k|k) &= P(k|k-1)(1 - L(k)), \\ P(k+1|k) &= a^2 P(k|k) + q. \end{aligned}$$

The multistep Kalman predictor may be given by $\hat{x}(k+j|k) = a\hat{x}(k+j-1|k)$ where $j = 1, \ldots, N_{pred}$ which is initialized with $\hat{x}(k|k)$ (i.e., the output of the Kalman filter). During a communication update, the following data array may be sent to controller 366:

$$y_{pred}(k|k) = \begin{bmatrix} \hat{x}(k|k) \\ \hat{x}(k+1|k) \\ \hat{x}(k+2|k) \\ \vdots \\ \hat{x}(k+N_{pred}|k) \end{bmatrix}$$

where the first element of the array may correspond to the filtered measurement at the current time and the last element is the predicted value $N_{pred}$ time steps into the future.

Under training mode, measurement data and the setpoint of the control loop may be collected, if available. The outputs of the training mode may be the model parameters and noise statistics that are used for the predictive mode. The input to the predictive mode may be the output measurement (ideally, supplied every $T_{s,ctrl}$ time steps to update the filter) and the output may be the data array that is transmitted to the controller every $T_{s,comm}$ time steps.

Still referring to FIGS. 9A-9B, other predictive models and algorithms may be used for predicting future values of the building variable or measured variable. For example, a deterministic and stochastic model may be used. An autoregressive model may be used. An example of such a predictive model can be found in U.S. patent application Ser. No. 14/717,593 titled "Building Management System for Forecasting Time Series Values of Building Variables" filed May 20, 2015.

Figure 10A:
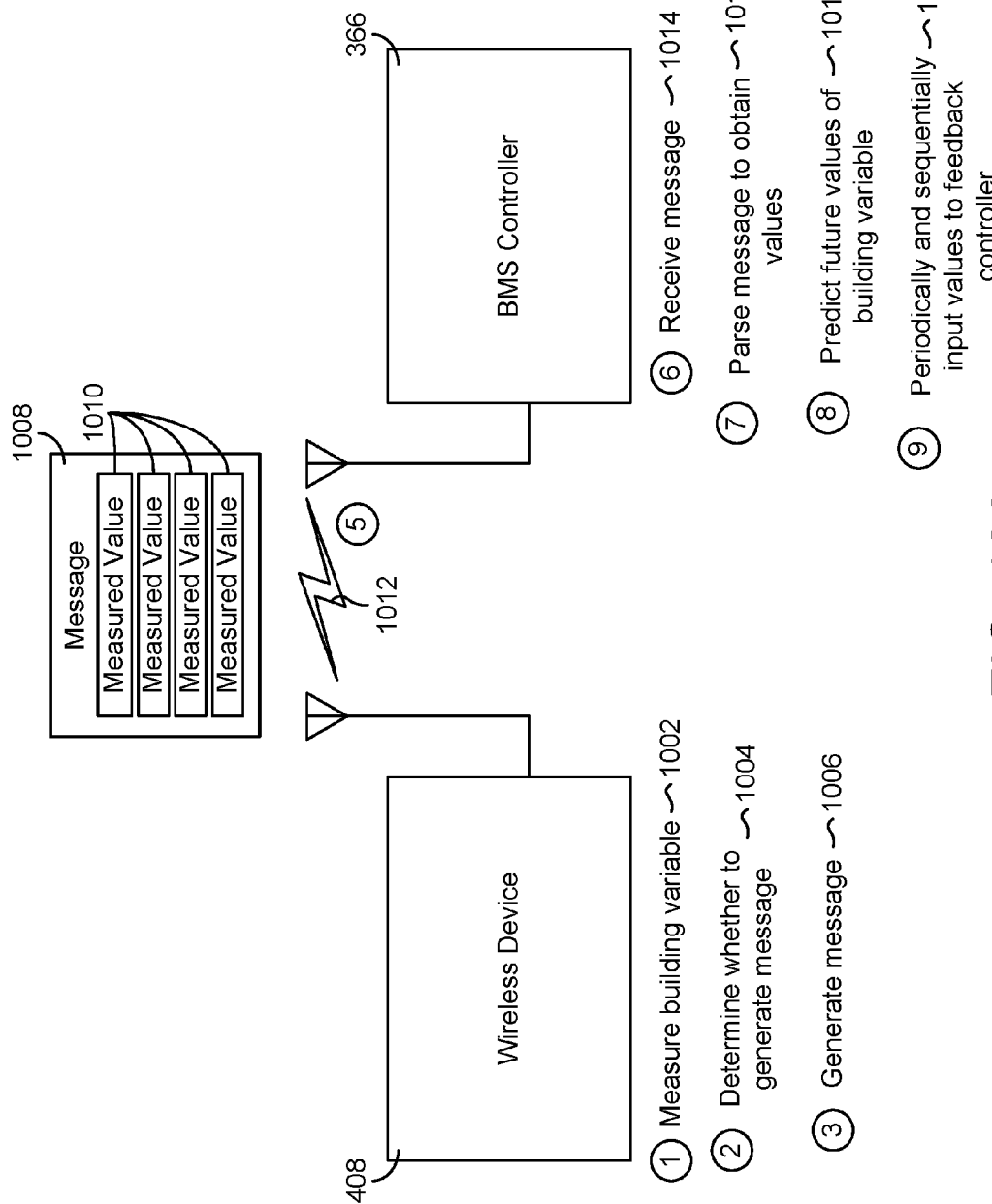
FIG. 10A is a drawing of another new wireless transmission timing process which may be performed by the system of FIG. 4, according to an exemplary embodiment.
Figure 10B:
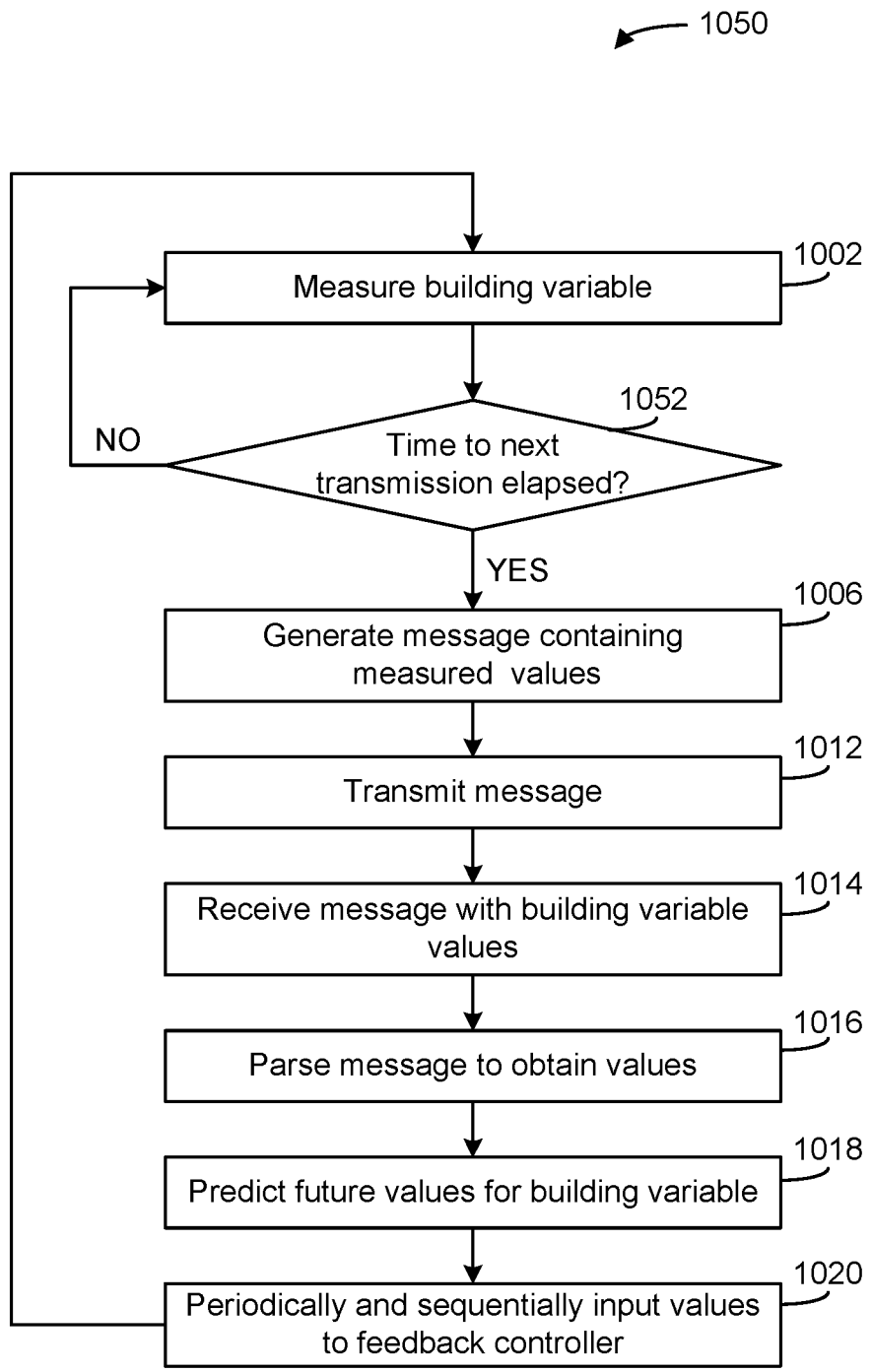
FIG. 10B is a flowchart of another new wireless transmission timing process which may be performed by the system of FIG. 4, according to an exemplary embodiment.

Referring now to FIGS. 10A-10B, a system 1000 and process 1050 for another new wireless transmission timing method are shown, according to another exemplary embodiment. The systems and methods shown in FIGS. 10A-10B may be performed by the system of FIG. 4. In this embodiment, predictions are made on the controller side of the system. In some embodiments, wireless device 408 continues to take measurements at a normal sampling rate, transmits a history of a predetermined length to controller 366, and allows controller 366 to make the predictions. System 1000 and process 1050 may include step 1002, in which a value of a building variable is measured. In some embodiments, step 1002 may be performed by wireless device 408. Referring to FIGS. 5B and 10A-10B, step 1002 may be performed by sensor 502. In some embodiments, step 1002 is executed by another component of wireless device 408 which may not be shown. System 1000 and process 1050 may not include taking more measurements than transmissions. For example, if a transmission is sent once every six minutes, it may not be necessary to measure a value more often than every six minutes. In other embodiments, system 1000 and process 1050 include taking measurements more often than transmissions are sent. For example, if a transmission is sent every fifteen minutes, measurements may be made every minute.

In step 1004, wireless device 408 may determine whether to generate a message. In some embodiments, wireless device 408 decides to generate a new message when a change in value occurs, when a magnitude of the error between the predicted value and the later measured value of the same time is too large, a rate of change of an error or of measurements is over a predetermined threshold, etc. In some embodiments, the generation of a new message leads to the transmission of the new message. The transmission of a new message may begin a new transmission interval. For example, a transmission interval may be four minutes long, and may span time 1 to time 5. If a change of value is detected at time 3, a new transmission interval may span time 3 to time 7. In some embodiments, if a user makes a change to the system, a new message may be generated. For example, if a user changes a setpoint or a setting of the system, a new message may be generated for transmittal to the feedback controller.

The time constant of a system may change, making predictions inaccurate. For example, the frequency response of a temperature control system can change due to a change in occupancy of a particular zone. In some embodiments, the system retunes and/or redefines the prediction algorithm if an error commonly occurs or if an error occurs too often. In other embodiments, the system retunes and/or redefines the prediction algorithm if new messages are sent too often or if corrections are made too often. For example, if a new message is being sent twice in twenty controller update periods, the system may retune the prediction algorithm. Retuning can occur periodically and automatically. For example, retuning of the algorithm may occur every five controller update periods. In some embodiments, retuning occurs based on conditions such as a frequency of errors. For example, if an error is detected three times in ten controller update periods, retuning of the prediction algorithm may occur.

System 1000 and process 1050 may include step 1006, in which a message is generated. Referring to FIGS. 5B and 10A-10B, a message 1008 may be generated containing measured values 1010. In some embodiments, measured values 1010 may be a single value. Message 1008 may be generated such that the existing controller may be used without making changes to the control algorithm. For example, message 1008 may be in a format that may be read by message parser 416. In some embodiments, message 1008 may be generated such that changes may need to be made to the control algorithm. Message 1008 may be generated in a format which may not be directly input to the controller. In some embodiments, the controller is BMS controller 366 and may be a component of BMS controller 366 such as feedback controller 418. Message 1008 may be parsed by message parser 416 such that the processed values may be input directly to feedback controller 418.

Referring still to FIGS. 10A-10B, system 1000 and process 1050 may include step 1012 in which message 1008 is transmitted to the controller. In some embodiments, the controller is BMS controller 366. In other embodiments, the controller is a component of BMS controller 366 such as feedback controller 418. Step 1012 may occur through the use of wireless radio chips 514 and 516 of FIG. 5B. In some embodiments, transmission step 1012 occurs wirelessly over wireless communications protocols such as ZigBee, WiFi, Bluetooth, NFC, etc. In other embodiments, transmission step 1012 may require a physical connection or a wired connection.

System 1000 and process 1050 may further include step 1014, in which message 1008 is received. In some embodiments, message 1008 is transmitted from wireless device 408 and is received by BMS controller 366. Message 1008 may be transmitted through wireless radio chip 514 and received wireless radio chip 516. In some embodiments, message 1008 may be received by a component of BMS controller 366.

System 1000 and process 1050 may further include step 1016, in which message 1008 is parsed to obtain values. In some embodiments, step 1016 is performed by BMS controller 366. In other embodiments, step 1016 is performed by a component of BMS controller 366 such as message parser 416. Message parser 416 may parse message 1008 to separate each value for sequential input to feedback controller 418. For example, message parser 416 may separate measured values 1010 for input to BMS controller 366. In some embodiments, message 1008 contains indicators for the order in which the values are to be input to feedback controller 418. In other embodiments, message parser 416 may input values to feedback controller 418 in the order the values are arranged in message 1008.

System 1000 and process 1050 may continue with step 1018 in which future values of the building variable (or measured variable) are predicted. In some embodiments, step 1018 may be performed by wireless device 408. Step 1018 may be performed by low-power microcontroller 504, or a component of low-power microcontroller 504. In some embodiments, step 1018 is performed by future value predictor 506 of wireless device 408. The algorithm for predicting the future value may use any prediction method. In some embodiments, filters, such as a Kalman filter may be used to predict future values of the measured variable. In other embodiments, deterministic and stochastic models are be used. Autoregressive models may be used. Exemplary models and algorithms described for FIGS. 9A-9B apply to the systems and methods of FIGS. 10A-10B as well.

Still referring to FIGS. 10A-10B, system 1000 and process 1050 may include step 1020, in which the predicted and parsed values from steps 1018 and 1016 respectively may be periodically and sequentially input to a feedback controller. In some embodiments, the feedback controller is feedback controller 418. Values may be measured values 1010 and/or predicted values. In some embodiments, the values are marked by indicators with whether each value is measured or predicted. For example, a value received by feedback controller 418 may be flagged as a predicted value, and may elicit additional processing in the control algorithm. In other embodiments, the values are not marked by indicators, and feedback controller 418 may not be aware of which values are measured and which are predicted. Feedback controller 418 may not be configured to handle predicted values, and in some embodiments, may not be configured to identify extraneous data that is not the value needed for the control algorithm. In some embodiments, multiple measured values 1010 are received by BMS controller 366 and used to make predictions for a horizon of a predetermined length. In other embodiments, a single measured value 1010 is received by BMS controller and used to make predictions for the same horizon. Predictions may be made for a shorter, or longer horizon, and the length of the horizon may be determined by a user, or automatically by the system.

Referring now to FIG. 10B, process 1050 is shown to include step 1052, which may be an embodiment of step 1004 of FIG. 10A. Repeated figure numbers indicate similar items or steps. Process 1050 may proceed from step 1002 to step 1052. In step 1052, wireless device 408 may determine whether the transmission interval has elapsed. In some embodiments, if the time to the next transmission has elapsed, process 1050 may continue with step 1006. If the time to the next transmission has not elapsed, process 1050 may continue with making another measurement of measured or building variable in step 1002. Step 1052 may be performed, in some embodiments, by components of BMS controller 366. For example, step 1052, in which a determination is made as to whether the time to the next transmission has elapsed, may be performed by transmission timer 508. In some embodiments, a separate processor or module of low-power microcontroller 504 performs step 1052. In other embodiments, a separate component of wireless device 408 performs step 1052.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building control system comprising:
  a wireless measurement device comprising:
    a sensor that measures a plurality of values of an environmental variable at a location of the wireless measurement device;
    a predictor that uses the plurality of values of the environmental variable to predict one or more future values of the environmental variable; and
    a first wireless radio that periodically transmits, at a transmission interval, a message comprising a current value of the environmental variable and the one or more predicted future values of the environmental variable;
  wherein the wireless measurement device compares an actual measured value of the environmental variable with a previously-predicted value of the environmental variable and transmits the message to the controller in response to a determination that the actual measured value differs from the previously-predicted value; and a controller comprising:
- a second wireless radio that receives the message from the wireless measurement device;
- a message parser that parses the message to extract the current value and the one or more predicted future values of the environmental variable; and
- a feedback controller that periodically and sequentially applies, at a controller update interval shorter than the transmission interval, each of the current value and the one or more predicted future values as an input to a control algorithm that operates to control the environmental variable.

2. The building control system of claim 1, wherein the wireless measurement device periodically measures the environmental variable at a measurement interval shorter than the transmission interval.

3. The building control system of claim 1, wherein the wireless measurement device predicts a future value of the environmental variable for each controller update interval within the transmission interval.

4. The building control system of claim 1, wherein the wireless measurement device:
- compares the current measured value of the environmental variable with a previous measured value of the environmental variable;
- determines a rate of change of the environmental variable between the current and previous measured value; and
- transmits the message to the controller in response to a determination that the rate of change exceeds a threshold.

5. The building control system of claim 1, wherein the wireless measurement device:
- compares an actual measured value of the environmental variable at a particular time with a previously-predicted value of the environmental variable for the particular time;
- determines whether a difference between the actual measured value and the previously-predicted value exceeds a threshold; and
- transmits the message to the controller in response to a determination that the difference between the actual measured value and the previously-predicted value exceeds the threshold.

6. The building control system of claim 1, wherein the wireless measurement device:
- compares an actual measured value of the environmental variable with at least one of a previously-predicted value of the environmental variable and a previously-measured value of the environmental variable; and
- redefines a prediction algorithm used by the predictor in response to at least one of:
  - a difference between the actual measured value of the environmental variable and the previously-predicted value of the environmental variable exceeding a threshold; and
  - a rate of change of the environmental variable exceeding a threshold.

7. A method for controlling an environmental variable in a building control system, the method comprising:
- measuring a plurality of values of the environmental variable using a sensor of a wireless measurement device;
- predicting, by the wireless measurement device, one or more future values of the environmental variable based on the plurality of values;
- periodically transmitting, at a transmission interval, a message from the wireless measurement device to a controller, the message comprising a current value of the environmental variable and the one or more predicted future values of the environmental variable;
- comparing an actual measured value of the environmental variable at a particular time with a previously-predicted value of the environmental variable for the particular time;
- determining whether a difference between the actual measured value and the previously-predicted value exceeds a threshold;
- transmitting the message to the controller in response to a determination that the difference between the actual measured value and the previously-predicted value exceeds the threshold;
- parsing the message at the controller to extract the current value and the one or more predicted future values of the environmental variable; and
- periodically and sequentially applying, at a controller update interval shorter than the transmission interval, each of the current value and the one or more predicted future values as an input to a control algorithm that operates to control the environmental variable.

8. The method of claim 7, wherein measuring the plurality of values of the environmental variable comprises periodically measuring the environmental variable at a measurement interval shorter than the transmission interval.

9. The method of claim 7, further comprising:
- comparing the current measured value of the environmental variable with a previous measured value of the environmental variable;
- determining a rate of change of the environmental variable between the current and previous measured value; and
- transmitting the message to the controller in response to a determination that the rate of change exceeds a threshold.

10. The method of claim 7, wherein predicting the environmental variable comprises predicting a future value of the environmental variable for each controller update interval within the transmission interval.

11. The method of claim 7, further comprising:
- comparing an actual measured value of the environmental variable with a previously-predicted value of the environmental variable; and
- adjusting the transmission interval based on one of:
  - a difference between the actual measured value of the environmental variable and the previously-predicted value of the environmental variable; and
  - a rate of change of the environmental variable.

12. The method of claim 7, further comprising:
- comparing an actual measured value of the environmental variable with the previously-predicted value of the environmental variable; and
- redefining a prediction algorithm used by the wireless measurement device based on one of:
  - a difference between the actual measured value of the environmental variable and the previously-predicted value of the environmental variable; and
  - a rate of change of the value of the environmental variable.

13. A wireless measurement device comprising:
- a sensor that measures a plurality of values of an environmental variable at a location of the wireless measurement device;
- a predictor that uses the plurality of values of the environmental variable to predict one or more future values of the environmental variable;

a first wireless radio that periodically transmits to a controller, at a transmission interval, a message comprising a current value of the environmental variable and the one or more predicted future values of the environmental variable;

a transmission timer that controls the transmission interval, wherein the controller is configured to control the environmental variable using the message and a control algorithm; and a comparator that compares an actual measured value of the environmental variable with a previously-predicted value of the environmental variable and determines whether a difference between the actual measured value and the previously-predicted value exceeds a threshold, wherein the message is transmitted to the controller in response to a determination that the actual measured value differs from the previously-predicted value by an amount in excess of the threshold.

14. The wireless measurement device of claim 13, configured to periodically measure the environmental variable at a measurement interval shorter than the transmission interval.

15. The wireless measurement device of claim 13, wherein the predictor predicts a future value of the environmental variable for each of a plurality of controller update intervals within the transmission interval.

16. The wireless measurement device of claim 13, further comprising:

a comparator that compares a current measured value of the environmental variable with a previous measured value of the environmental variable and determines whether a rate of change between the current measured value and the previous measured value exceeds a threshold, wherein the message is transmitted to the controller in response to a determination that the rate of change exceeds the threshold.

17. The wireless measurement device of claim 13, further comprising:

a comparator that compares an actual measured value of the environmental variable with a previously-predicted value of the environmental variable, wherein the transmission timer adjusts the transmission interval based on one of:

a difference between the actual measured value of the environmental variable and the previously-predicted value of the environmental variable; and a rate of change of the environmental variable.

* * * * *